(12) United States Patent
Baek et al.

(10) Patent No.: US 11,983,366 B2
(45) Date of Patent: May 14, 2024

(54) DISPLAY DEVICE

(71) Applicant: Samsung Display Co., Ltd., Yongin-Si (KR)

(72) Inventors: Gyungmin Baek, Yongin-si (KR); Hyuneok Shin, Gwacheon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 35 days.

(21) Appl. No.: 17/553,036

(22) Filed: Dec. 16, 2021

(65) Prior Publication Data
US 2022/0269370 A1    Aug. 25, 2022

(30) Foreign Application Priority Data
Feb. 22, 2021  (KR) .................. 10-2021-0023175

(51) Int. Cl.
*G06F 3/044*  (2006.01)
*G06F 3/041*  (2006.01)

(52) U.S. Cl.
CPC .......... *G06F 3/0443* (2019.05); *G06F 3/0412* (2013.01); *G06F 3/0446* (2019.05); *G06F 3/0445* (2019.05); *G06F 2203/04111* (2013.01); *G06F 2203/04112* (2013.01)

(58) Field of Classification Search
CPC .............. G06F 3/0412; G06F 3/04164; G06F 3/041662; G06F 3/0421; G06F 3/0443; G06F 3/0445; G06F 3/0446; G06F 2203/04103; G06F 2203/04111; G06F 2203/04112; H01B 1/02; H01B 3/025; H01B 5/14; H10K 59/12; H10K 59/131; H10K 59/40
See application file for complete search history.

(56) References Cited

U.S. PATENT DOCUMENTS

| | | | |
|---|---|---|---|
| 10,928,964 B2 | 2/2021 | Kim et al. | |
| 2008/0277259 A1* | 11/2008 | Chang .................. | G06F 3/0446 200/600 |
| 2010/0013745 A1* | 1/2010 | Kim ...................... | G06F 3/0412 345/76 |
| 2014/0367652 A1* | 12/2014 | Cho ....................... | H10K 59/12 257/40 |
| 2019/0371865 A1 | 12/2019 | Lee et al. | |
| 2020/0176529 A1 | 6/2020 | Choi et al. | |
| 2020/0301539 A1 | 9/2020 | Lee et al. | |
| 2020/0350512 A1* | 11/2020 | Guo ....................... | H10K 59/12 |
| 2020/0411596 A1* | 12/2020 | Guo ....................... | G06F 3/0443 |

FOREIGN PATENT DOCUMENTS

| | | |
|---|---|---|
| KR | 10-2019-0048572 A | 5/2019 |
| KR | 10-2020-0067284 A | 6/2020 |
| KR | 10-2020-0113060 A | 10/2020 |

* cited by examiner

*Primary Examiner* — Julie Anne Watko
(74) *Attorney, Agent, or Firm* — Innovation Counsel LLP

(57) ABSTRACT

A display device includes a display panel configured to display an image, and an input sensing layer disposed on the display panel. The input sensing layer includes a sensing insulating layer disposed on the display panel and a conductive layer disposed on the sensing insulating layer. The conductive layer includes a barrier layer disposed directly on the sensing insulating layer and including metal nitride and a main conductive layer disposed on the barrier layer.

26 Claims, 16 Drawing Sheets

DISPLAY DEVICE

CROSS-REFERENCE TO RELATED APPLICATIONS

This U.S. non-provisional patent application claims priority under 35 U.S.C. § 119 of Korean Patent Application No. 10-2021-0023175, filed on Feb. 22, 2021, the disclosure of which is hereby incorporated by reference in its entirety.

BACKGROUND

The present disclosure herein relates to a display device providing an input sensing feature.

Multimedia electronic devices such as televisions, mobile phones, tablet computers, navigation systems, and game machines are equipped with electronic devices for displaying images. An electronic device may include an input sensing layer capable of providing a touch-based input that enables a user to input information or commands intuitively and conveniently in addition to conventional ways of providing inputs such as buttons, keyboards, and mouse devices.

SUMMARY

The present disclosure provides a display device including an input sensing layer with improved process reliability.

According to an embodiment of the inventive concept, a display device including a display panel configured to display an image, and an input sensing layer disposed on the display panel. The input sensing layer includes a sensing insulating layer disposed on the display panel and a conductive layer disposed on the sensing insulating layer. The conductive layer includes a barrier layer that is disposed directly on the sensing insulating layer and including metal nitride and a main conductive layer disposed on the barrier layer.

According to another embodiment of the inventive concept, a display device includes a display panel configured to display an image, and an input sensing layer disposed on the display panel. The input sensing layer includes a first insulating layer disposed on the display panel, a first conductive layer disposed on the first insulating layer, a second insulating layer covering the first conductive layer, and a second conductive layer disposed on the second insulating layer. The second conductive layer includes a second barrier layer including metal nitride and a second main conductive layer disposed on the second barrier layer.

The barrier layer that contains metal nitride may prevent formation of a metal oxide layer between the conductive layer and the sensing insulating layer, and as a result, may improve process reliability in forming the input sensing layer.

BRIEF DESCRIPTION OF THE FIGURES

The accompanying drawings are included to provide further understanding of the inventive concept of the present disclosure, and are incorporated in and constitute a part of the present disclosure. The drawings illustrate embodiments of the inventive concept and, together with the detailed description, serve to explain principles of the inventive concept. In the drawings.

DETAILED DESCRIPTION

Figure 1:
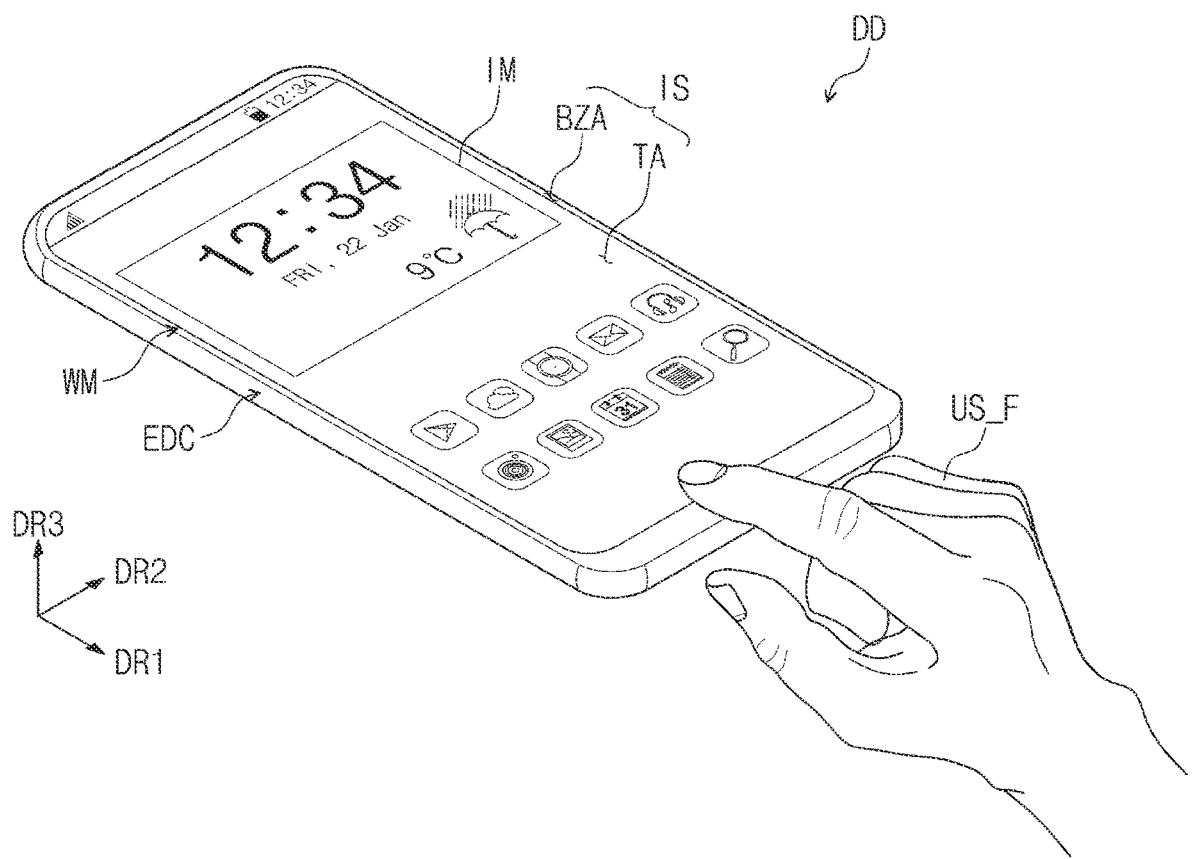
FIG. 1 is a perspective view of a display device according to an embodiment of the inventive concept.

In the present disclosure, it will be understood that when an element (or region, layer, portion, etc.) is referred to as being "on," "connected to," or "coupled to" another element, it can be directly on, connected, or coupled to the other element, or one or more intervening elements may be present therebetween.

Like reference numerals refer to like elements throughout the present disclosure. In addition, in the drawings, the thicknesses, ratios, and dimensions of elements may be exaggerated for effective description of the technical contents.

As used herein, the term "and/or" includes any and all combinations that the listed elements or the associated configurations can define.

It will be understood that, although the terms first, second, etc. may be used herein to describe various elements, these elements should not be limited by these terms. These terms are only used to distinguish one element from another element. For example, a first element could be termed a second element without departing from the scope of the present disclosure. Similarly, the second element may also be referred to as the first element. The terms of a singular form include one or more plural forms unless otherwise specified.

Terms, such as "below," "lower," "above," "upper," and the like, are used herein for ease of description to describe one element's relation to another element(s) as illustrated in the figures. The above terms are relative terms and may be described based on the directions indicated in the drawings.

Unless otherwise defined, terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that the terms "include" and/or "have" used herein specify the presence of stated features, integers, steps, operations, elements, components, and/or groups thereof, but do not preclude the presence or addition of one or more other features, integers, steps, operations, elements, components, and/or groups thereof.

The terms "part" and "unit" may mean software components or hardware components that perform specific tasks. A hardware component may include, for example, a field-programmable gate array (FPGA) or an application-specific integrated circuit (ASIC). A software component may refer to an executable code and/or a datum used by an executable code in a storage medium. Therefore, software components may be, for example, object-oriented software components, class components, and working components, and include processes, functions, properties, procedures, subroutines, program code segments, drivers, firmware, microcodes, programmable logic circuits, data, databases, data structures, tables, arrays, or variables.

Hereinafter, embodiments of the inventive concept will be described with reference to the accompanying drawings.

Figure 2A:
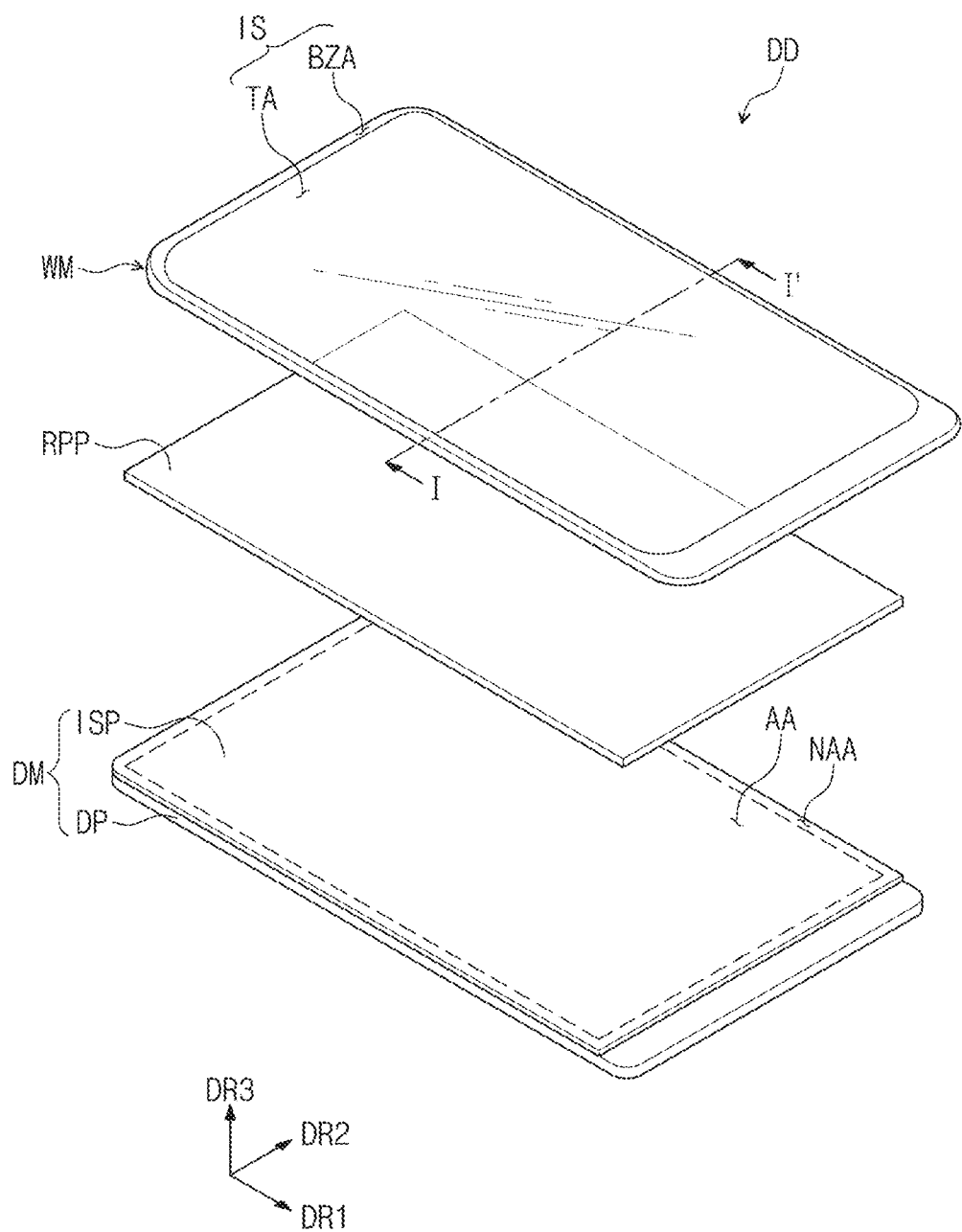
FIG. 2A is an exploded perspective view of the display device according to an embodiment of the inventive concept.
Figure 2B:
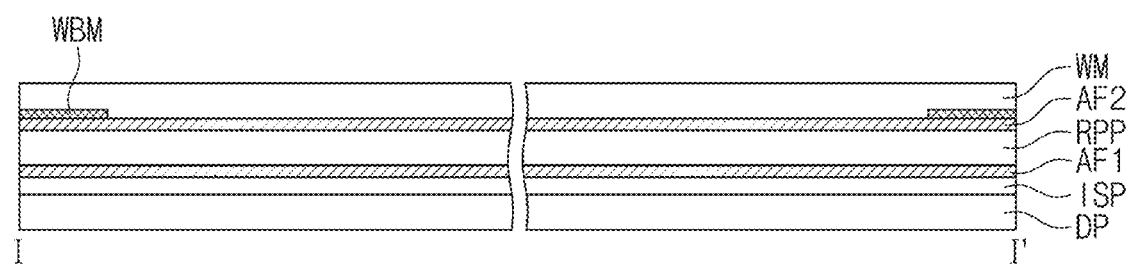
FIG. 2B is a cross-sectional view taken along line I-I' illustrated in FIG. 2A.
Figure 2B:
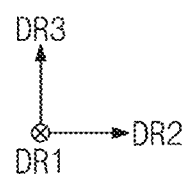

FIG. 1 is a perspective view of a display device according to an embodiment of the inventive concept, FIG. 2A is an exploded perspective view of the display device according to an embodiment of the inventive concept, and FIG. 2B is a cross-sectional view taken along line I-I' illustrated in FIG. 2A.

Referring to FIG. 1, a display device DD may have a rectangular shape having long sides in a first direction DR1 and short sides in a second direction DR2 that crosses the first direction DR1. However, the present disclosure is not limited thereto, and the display device DD may have various shapes such as a circle and a polygon.

The display device DD may be operated according to an electrical signal. The display device DD may be implemented in various forms and/or configurations. For example, the display device DD may be applied to various electronic devices such as a smart watch, a tablet, a laptop computer, a computer, and a smart television.

A direction that substantially perpendicularly crosses a plane defined by the first direction DR1 and the second direction DR2 is referred to as a third direction DR3. In the present disclosure, the expression "when viewed on a plane" may mean a state of being viewed in the third direction DR3.

The upper surface of the display device DD may be referred to as a display surface IS and may be parallel to a plane defined by the first direction DR1 and the second direction DR2. Images IM generated in the display device DD may be displayed to a user through the display surface IS.

The display surface IS may be divided into a transmission region TA and a bezel region BZA. The transmission region TA may correspond to a region in which images IM are displayed. A user visually recognizes the images IM through the transmission region TA of the display surface IS. In the present embodiment, the transmission region TA is illustrated in a rectangular shape with rounded corners. However, the present disclosure is not limited thereto, and the transmission region TA may have various shapes without departing from the scope of the present disclosure.

The bezel region BZA is adjacent to the transmission region TA. In one embodiment, the bezel region BZA may have a predetermined color. The bezel region BZA may surround the transmission region TA. However, the present disclosure is not limited thereto, and the bezel region BZA may be disposed to be adjacent to one side of the transmission region TA and may be omitted without departing from the scope of the present disclosure.

The display device DD may sense an external input applied thereto from the outside. The external input may include various types of inputs applied from the outside of the display device DD. For example, the external input may include not only a touch by a part of a body such as a user's hand US_F, but also a touch by a pen. In addition, the external input may include a non-touch external input (e.g., hovering) applied close to or within a predetermined adjacent distance from the display device DD. Furthermore, the external input may include various forms of inputs such as force, pressure, temperature, and light.

As illustrated in FIGS. 2A and 2B, the display device DD may include a window WM, a display module DM, and an anti-reflection film RPP. The display module DM may include a display panel DP and an input sensing layer ISP.

The window WM may include a transparent material capable of displaying images IM therethrough. For example, the window WM may include glass, sapphire, plastic, and the like. The window WM is illustrated as a single layer in the present embodiment, but the present disclosure is not limited thereto and may include a plurality of layers without deviating from the scope of the present disclosure. Meanwhile, although not illustrated, the bezel region BZA of the display device DD described above may substantially correspond to a region of the window WM in which a material including a predetermined color is printed. As an example of the inventive concept, the window WM may include a light-blocking pattern WBM that defines the bezel region BZA. For example, the light-blocking pattern WBM may be a colored organic film and may be formed by a coating method.

The display panel DP may be a light-emitting display panel, and the present disclosure is not limited thereto. For example, the display panel DP may be an organic light-emitting display panel, an inorganic light-emitting display panel, or a quantum dot light-emitting display panel. A light-emitting layer of the organic light-emitting display panel may contain an organic light-emitting material. A light-emitting layer of the inorganic light-emitting display panel may contain an inorganic light-emitting material. A light-emitting layer of the quantum dot light-emitting display panel may include one or more of quantum dots, quantum rods, and the like. Hereinafter, the display panel DP will be described as an organic light-emitting display panel for convenience of explanation without departing from the scope of the present disclosure.

The input sensing layer ISP may be disposed on the display panel DP using an adhesive layer or may be directly disposed on the display panel DP. According to an embodiment, the input sensing layer ISP may be formed on the display panel DP through a continuous process. In this case, the input sensing layer ISP may be disposed directly on the display panel DP without the adhesive layer between the input sensing layer ISP and the display panel DP.

The display panel DP generates images IM, and the input sensing layer ISP may obtain coordinate information according to an external input (e.g., a touch event).

The anti-reflection film RPP may reduce reflectivity of external light that is incident from an upper side of the window WM. The anti-reflection film RPP may include a retarder and a polarizer. The retarder may be a film-type retarder or a liquid crystal coated retarder and include a λ/2 retarder and/or a λ/4 retarder. The polarizer may also be a film-type polarizer or a liquid crystal coated polarizer. The film-type polarizer may include an elongation-type synthetic resin film, and the liquid crystal coated-type polarizer may include liquid crystals arranged in a predetermined arrangement. The retarder and the polarizer may be provided as a single polarizing film. The anti-reflection film RPP may further include a protective film disposed above or below the polarizing film.

The anti-reflection film RPP may be disposed on the input sensing layer ISP. That is, the anti-reflection film RPP may be disposed between the input sensing layer ISP and the window WM. The input sensing layer ISP, the anti-reflection film RPP, and the window WM may be coupled to one another by adhesive films. For example, a first adhesive film AF1 may be disposed between the input sensing layer ISP and the anti-reflection film RPP, and a second adhesive film AF2 of the adhesive films may be disposed between the anti-reflection film RPP and the window WM. In this case, the anti-reflection film RPP is coupled to the input sensing layer ISP by the first adhesive film AFL, and the window WM is coupled to the anti-reflection film RPP by the second adhesive film AF2.

According to an embodiment, each of the first and second adhesive films AF1 and AF2 may include an optically clear adhesive film (OCA). However, the first and second adhesive films AF1 and AF2 are not limited thereto and may include an ordinary adhesive or glue. For example, each of the first and second adhesive films AF1 and AF2 may include an optically clear resin (OCR), or a pressure-sensitive adhesive film PSA.

In addition to the anti-reflection film RPP, a functional layer for imparting a specific property such as a protective layer may be further disposed between the display module DM and the window WM.

The display module DM may display images IM according to an electrical signal and transmit/receive information on external inputs. The display module DM may include an active region AA and a non-active region NAA. The active region AA may correspond to a region that displays the images IM.

The non-active region NAA is adjacent to the active region AA. For example, the non-active region NAA may surround the active region AA. However, the present disclosure is not limited thereto, and the non-active region NAA may be defined in various shapes, sizes, and/or configurations with respect to the active region AA without departing from the scope of the present disclosure. According to an embodiment, the active region AA of the display module DM may correspond to at least a portion of the transmission region TA of the display surface IS.

Figure 3A:
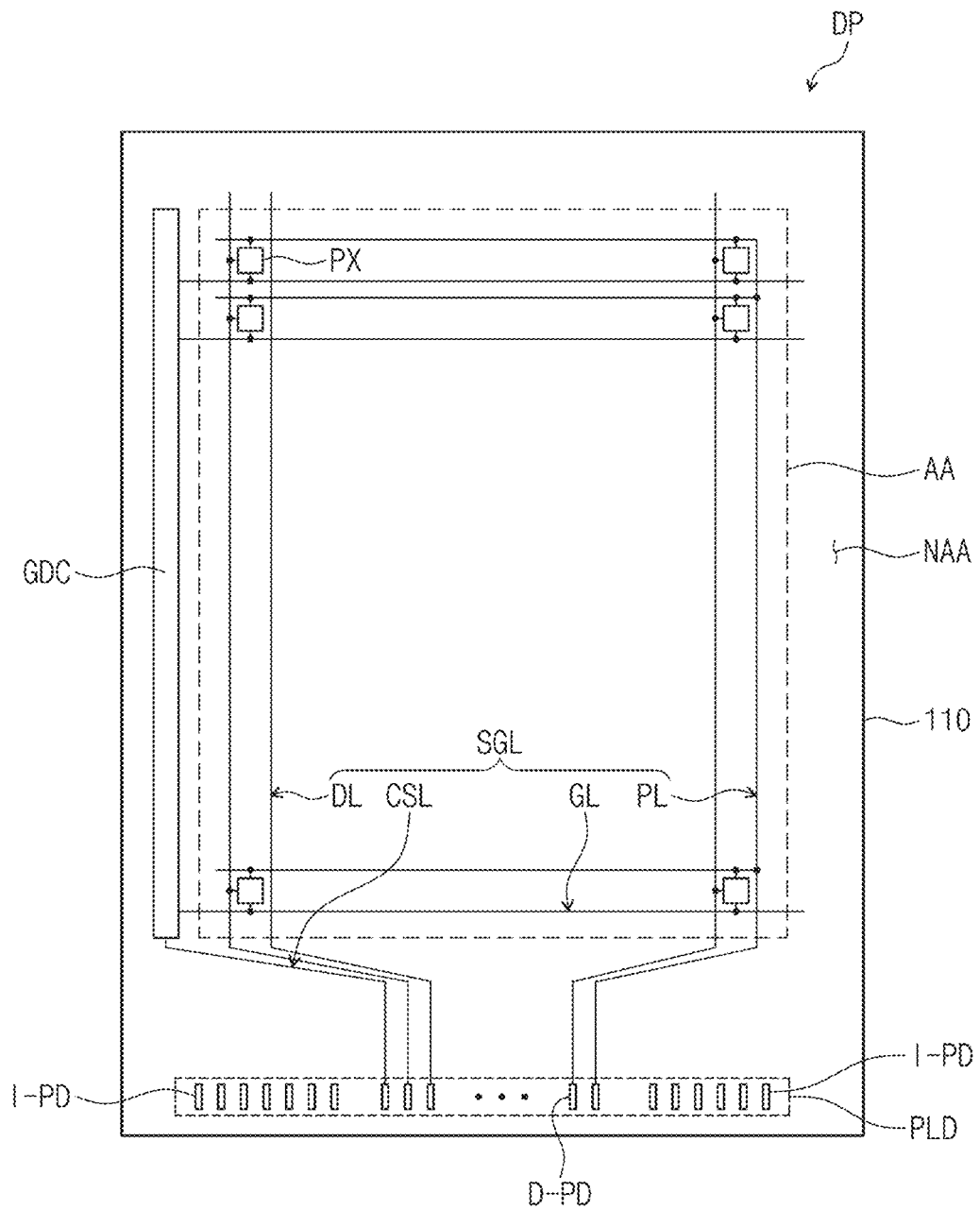
FIG. 3A is a plan view of a display panel according to an embodiment of the inventive concept.
Figure 3B:
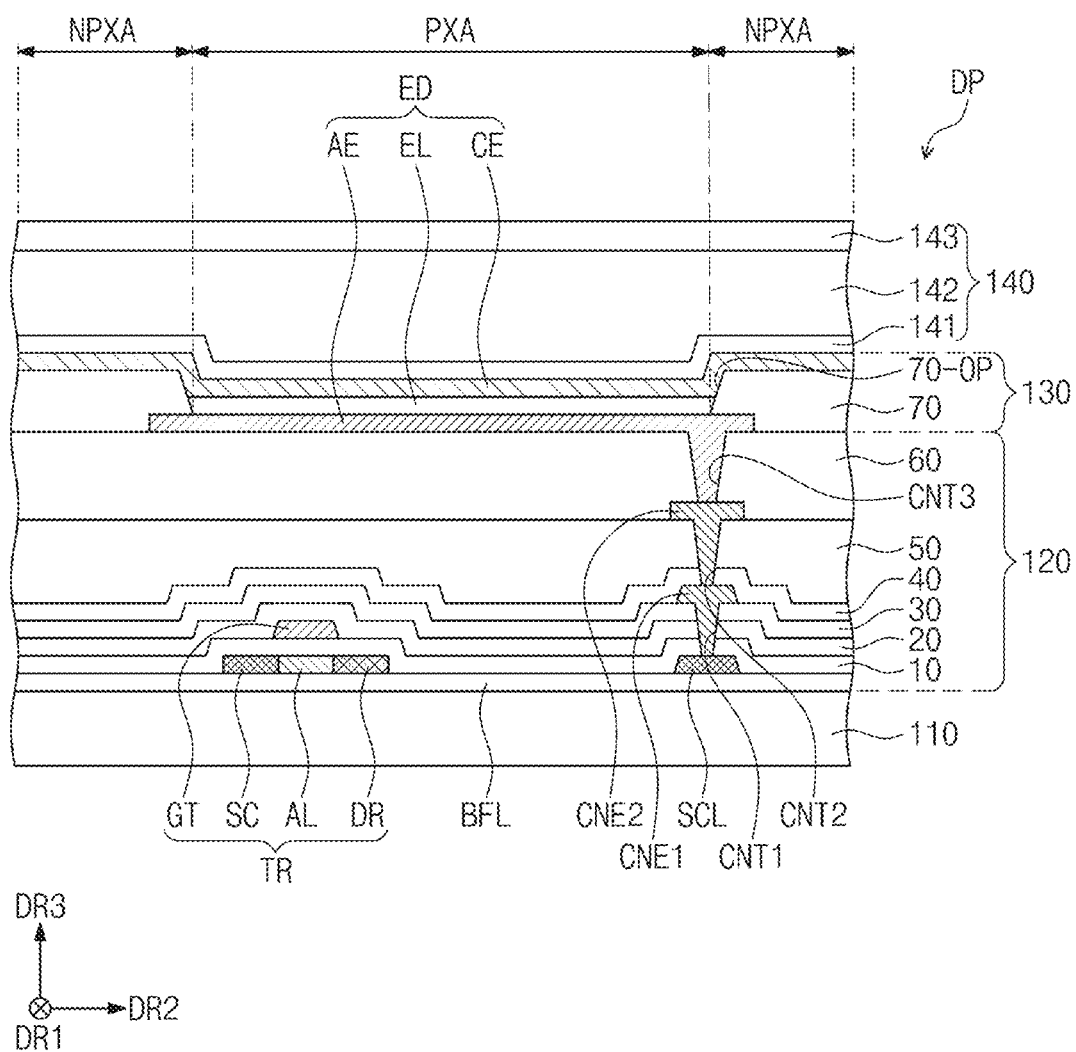
FIG. 3B is a cross-sectional view of the display panel according to an embodiment of the inventive concept.

FIG. 3A is a plan view of the display panel DP according to an embodiment of the inventive concept. FIG. 3B is a cross-sectional view of the display panel DP according to an embodiment of the inventive concept.

Referring to FIGS. 3A and 3B, the display panel DP may include a driving circuit GDC, a plurality of signal lines SGL, and a plurality of pixels PX. The display panel DP may further include a pad portion PLD disposed in the non-active region NAA. The pad portion PLD includes pixel pads D-PD that are connected to corresponding signal lines among the plurality of signal lines SGL.

The pixels PX are disposed in the active region AA. Each of the pixels PX may include a light-emitting element ED and a pixel driving circuit connected thereto. The light-emitting element ED may include an organic light-emitting diode. The driving circuit GDC, the signal lines SGL, the pad portion PLD, and the pixel driving circuit may be included in a circuit layer 120 illustrated in FIG. 3B.

The driving circuit GDC may include a gate driving circuit. The gate driving circuit generates a plurality of gate signals (hereinafter, gate signals) and outputs the gate signals sequentially to a plurality of gate lines GL (hereinafter, gate lines), which will be described later. The gate driving circuit may further output one or more control signals to the pixel driving circuit.

The signal lines SGL may include the gate lines GL, data lines DL, a power line PL, and a control signal line CSL. At least one gate line among the gate lines GL is respectively connected to a corresponding pixel among the pixels PX, and a data line among the data lines DL is respectively connected to the corresponding pixel among the pixels PX. The power line PL may be commonly connected to the pixels PX. The control signal line CSL may provide control signals to the gate driving circuit. The signal lines SGL may overlap the active region AA and the non-active region NAA.

The pad portion PLD may correspond to a portion to which a flexible circuit film is connected. The pad portion PLD may include the pixel pads D-PD for electrically connecting the flexible circuit film to the display panel DP and input pads I-PD for electrically connecting the flexible circuit film to the input sensing layer ISP. The pixel pads D-PD and the input pads I-PD may correspond to portions of the signal lines SGL disposed in the circuit layer 120 that are exposed from an insulating layer included in the circuit layer 120.

The pixel pads D-PD may be connected to corresponding pixels PX through the signal lines SGL. In addition, the driving circuit GDC may be connected to one pixel pad among the pixel pads D-PD.

The display panel DP may include a base layer 110, the circuit layer 120, a light-emitting element layer 130, and an encapsulation layer 140.

The base layer 110 may provide a surface on which the circuit layer 120 is disposed. The base layer 110 may include a glass material, a metal material, or a polymer material. However, the present disclosure is not limited thereto, and the base layer 110 may be an inorganic layer, an organic layer, or a composite material layer without deviating from the scope of the present disclosure.

The base layer 110 may have a multi-layered structure. For example, the base layer 110 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be respectively referred to as a base barrier layer.

Each of the first and second synthetic resin layers may contain a polyimide-based resin. In addition, each of the first and second synthetic resin layers may contain at least one of an acrylic-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin.

The circuit layer 120 may be disposed on the base layer 110. The circuit layer 120 may include an insulating layer, a semiconductor pattern, a conductive pattern, and a signal line. The insulating layer, the semiconductor layer, and the conductive layer may be formed on the base layer 110 by coating, deposition, or the like, and thereafter, the insulating layer, the semiconductor layer, and the conductive layer may be selectively patterned through photolithography processes to form the semiconductor pattern, the conductive pattern, and the signal line in the circuit layer 120.

The light-emitting element layer 130 may be disposed on the circuit layer 120. The light-emitting element layer 130 may include a light-emitting element ED. For example, the light-emitting element layer 130 may include an organic light-emitting material, an inorganic light-emitting material, a quantum dot, a quantum rod, a micro LED, or a nano LED.

The encapsulation layer 140 may be disposed on the light-emitting element layer 130. The encapsulation layer 140 may protect the light-emitting element layer 130 from foreign substances such as moisture, oxygen, and dust particles.

At least one inorganic layer may be formed on an upper surface of the base layer 110. The inorganic layer may contain at least one of aluminum oxide, titanium oxide, silicon oxide, silicon nitride, silicon oxynitride, zirconium oxide, or hafnium oxide. The inorganic layer may include multiple layers. Multi-layered inorganic layer may include a barrier layer and/or a buffer layer. In the present embodiment, the display panel DP includes a buffer layer BFL as the inorganic layer.

The buffer layer BFL may improve bonding between the base layer 110 and the semiconductor pattern of the circuit layer 120. The buffer layer BFL may contain at least one of silicon oxide, silicon nitride, or silicon oxynitride. For example, the buffer layer BFL may include a multi-layer structure in which a silicon oxide layer and a silicon nitride layer are alternately stacked.

The semiconductor pattern of the circuit layer 120 may be disposed on the buffer layer BFL. The semiconductor pattern may include polysilicon. However, the present disclosure is not limited thereto, and the semiconductor pattern may include amorphous silicon, low-temperature polycrystalline silicon, or oxide semiconductor without deviating from the scope of the present disclosure.

FIG. 3B illustrates a portion of the semiconductor pattern, and the semiconductor pattern may be further disposed in another region. The semiconductor pattern may be arranged across multiple pixels PX. The semiconductor pattern may have regions of different electrical properties depending on whether they are doped or not. For example, the semiconductor pattern may include a first region having high conductivity and a second region having low conductivity. The first region may be doped with an n-type dopant or a p-type dopant. A p-type transistor may include a doped region doped with the p-type dopant, and an n-type transistor may include a doped region doped with the n-type dopant. The second region may be a non-doped region or a region doped with a concentration lower than that of the first region.

The conductivity of the first region may be greater than that of the second region, and the first region may substantially serve as an electrode or a signal line. The second region may substantially correspond to an active layer (or channel) of a transistor. In other words, one portion of the semiconductor pattern may correspond to an active layer of the transistor, other portions thereof may correspond to a source portion or a drain portion of the transistor, and still another portion thereof may correspond to a connection electrode or a connection signal line.

Each of the pixels PX may have an equivalent circuit including a plurality of transistors (e.g., seven transistors), one capacitor, and a light-emitting element ED, and the equivalent circuit diagram of each of the pixels PX may be modified in various forms without deviating from the scope of the present disclosure. FIG. 3B illustrates, as an example, a transistor TR and a light-emitting element ED included in a pixel PX.

The semiconductor pattern may include a source portion SC, an active portion AL, and a drain portion DR of the transistor TR. The source portion SC and the drain portion DR may extend in opposite directions from each other from the active portion AL in the second direction DR2. The semiconductor pattern may also include a connection signal line SCL. Although not illustrated separately in FIG. 3B, the connection signal line SCL may be connected to the drain portion DR of the transistor TR.

A first insulating layer 10 may be disposed on the buffer layer BFL. The first insulating layer 10 may overlap a plurality of pixels PX in common and cover the semiconductor pattern. The first insulating layer 10 may include an inorganic layer and/or an organic layer and have a single-layered or multi-layered structure. The first insulating layer 10 may contain at least one of aluminum oxide, titanium oxide, silicon oxide, silicon nitride, silicon oxynitride, zirconium oxide, or hafnium oxide. In one embodiment, the first insulating layer 10 may be a single-layered silicon oxide layer. Each of the insulating layers included in the circuit layer 120 to be described later may also include an inorganic layer and/or an organic layer and have a single-layered or multi-layered structure. The inorganic layer may contain at least one of the materials described above, but the present disclosure is not limited thereto.

A gate portion GT of the transistor TR may be disposed on the first insulating layer 10. The gate portion GT may have a metallic pattern. The gate portion GT may overlap at least a portion of the active portion AL. In the process of doping the semiconductor pattern, the gate portion GT may serve as a mask.

A second insulating layer 20 may be disposed on the first insulating layer 10 and cover the gate portion GT. The second insulating layer 20 may overlap the plurality of pixels PX in common. The second insulating layer 20 may include an inorganic layer and/or an organic layer and have a single-layered or multi-layered structure. The second insulating layer 20 may include at least one of silicon oxide, silicon nitride, or silicon oxynitride. In one embodiment, the second insulating layer 20 may have a multi-layered structure including a silicon oxide layer and a silicon nitride layer.

A third insulating layer 30 may be disposed on the second insulating layer 20. The third insulating layer 30 may have a single-layered or multi-layered structure. In one embodiment, the third insulating layer 30 may have a multi-layered structure including a silicon oxide layer and a silicon nitride layer.

A first connection electrode CNE1 may be disposed on the third insulating layer 30. The first connection electrode CNE1 may be connected to the connection signal line SCL through a first contact hole CNT1 that penetrates through the first, second and third insulating layers 10, 20, and 30.

A fourth insulating layer 40 may be disposed on the third insulating layer 30. The fourth insulating layer 40 may be a single-layered silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a second contact hole CNT2 that penetrates through the fourth insulating layer 40 and the fifth insulating layer 50.

A sixth insulating layer 60 may be disposed on the fifth insulating layer 50 and cover the second connection electrode CNE2. The sixth insulating layer 60 may be an organic layer.

The light-emitting element layer 130 may be disposed on the circuit layer 120. The light-emitting element layer 130 may include a light-emitting element ED. For example, the light-emitting element layer 130 may include an organic light-emitting material, an inorganic light-emitting material, a quantum dot, a quantum rod, a micro LED, or a nano LED. Hereinafter, an organic light-emitting element will be described as an example of the light-emitting element ED, but the present disclosure is not particularly limited thereto.

The light-emitting element ED may include a first electrode AE, a light-emitting layer EL, and a second electrode CE.

The first electrode AE may be disposed on the sixth insulating layer 60. The first electrode AE may be connected to the second connection electrode CNE2 through a third contact hole CNT3 that penetrates through the sixth insulating layer 60.

A pixel defining film 70 may be disposed on the sixth insulating layer 60 and cover a portion of the first electrode AE. The pixel defining film 70 may include an opening 70-OP defined therein. The opening 70-OP of the pixel defining film 70 exposes at least a portion of the first electrode AE.

The active region AA (see FIG. 3A) may include a light-emitting region PXA and a non-light-emitting region NPXA adjacent to the light-emitting region PXA. The non-light-emitting region NPXA may surround the light-emitting region PXA. In one embodiment, the light-emitting region PXA may correspond to a partial region of the first electrode AE that is exposed by the opening 70-OP.

The light-emitting layer EL may be disposed on the first electrode AE. The light-emitting layer EL may be disposed in a region corresponding to the opening 70-OP. The light-emitting layer EL may be formed to correspond to each of the pixels PX as being separated from each other. Each of the light-emitting layers EL may emit light in at least one of blue, red, or green colors. However, the present disclosure is not limited thereto, and the light-emitting layers EL may be connected to each other and be provided in common to correspond to the plurality of pixels PX without deviating from the scope of the present disclosure. In this case, the light-emitting layer EL may emit blue light or white light.

The second electrode CE may be disposed on the light-emitting layer EL. The second electrode CE may have an integrated shape and be disposed in common in the plurality of pixels PX.

Although not illustrated, a hole control layer may be disposed between the first electrode AE and the light-emitting layer EL. The hole control layer may be disposed in common in the light-emitting region PXA and the non-light-emitting region NPXA. The hole control layer may include a hole transport layer and further include a hole injection layer. An electron control layer may be disposed between the light-emitting layer EL and the second electrode CE. The electron control layer may include an electron transport layer and further include an electron injection layer. The hole control layer and the electron control layer may be formed in common in the plurality of pixels PX by using an open mask.

The encapsulation layer 140 may be disposed on the light-emitting element layer 130. The encapsulation layer 140 may include a first inorganic layer 141, an c 142, and a second inorganic layer 143 that are sequentially stacked, but the present disclosure is not limited thereto.

The first and second inorganic layers 141 and 143 may protect the light-emitting element layer 130 from moisture and oxygen, and the organic layer 142 may protect the light-emitting element layer 130 from foreign materials such as moisture, oxygen, and dust particles. The first and second inorganic layers 141 and 143 may include a silicon nitride layer, a silicon oxynitride layer, a silicon oxide layer, a titanium oxide layer, an aluminum oxide layer, or the like. The organic layer 142 may include an acrylic-based organic layer, but the present disclosure is not limited thereto.

Figure 4:
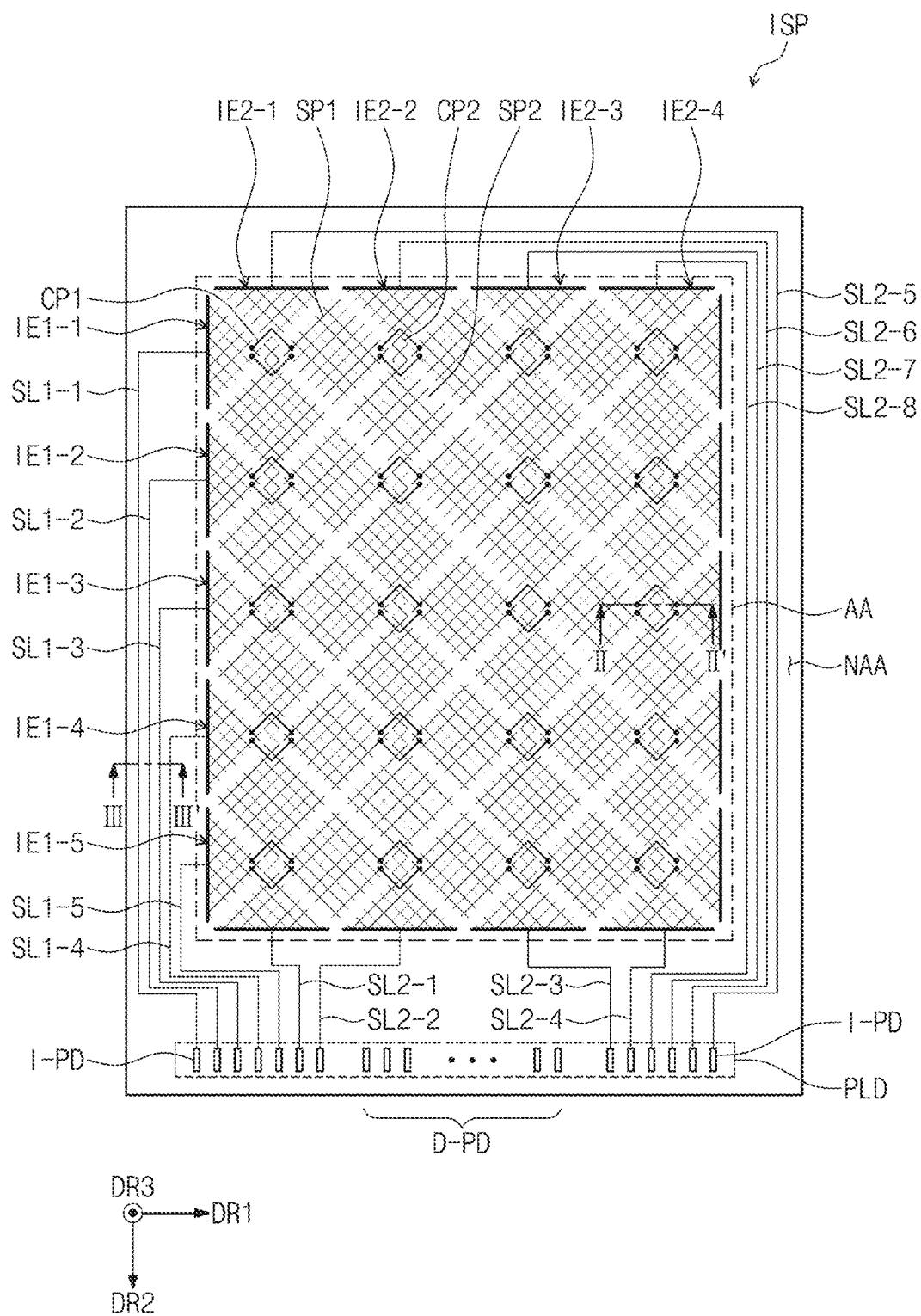
FIG. 4 is a plan view of an input sensing layer according to an embodiment of the inventive concept.

FIG. 4 is a plan view of the input sensing layer ISP according to an embodiment of the inventive concept.

Referring to FIG. 4, the input sensing layer ISP may include first sensing electrodes IE1-1 to IE1-5, first signal lines SL1-1 to SL1-5 connected to the first sensing electrodes IE1-1 to IE1-5, second sensing electrodes IE2-1 to IE2-4, and second signal lines SL2-1 to SL2-4 connected to the second sensing electrodes IE2-1 to IE2-4. In one embodiment, the input sensing layer ISP may further include third signal lines SL2-5 to SL2-8 connected to the second sensing electrodes IE2-1 to IE2-4. In this case, the second signal lines SL2-1 to SL2-4 may be connected to first ends of the second sensing electrodes IE2-1 to IE2-4, and the third signal lines SL2-5 to SL2-8 may be connected to second ends of the second sensing electrodes IE2-1 to IE2-4. The second ends of the second sensing electrodes IE2-1 to IE2-4 may be opposite to the first ends of the second sensing electrodes IE2-1 to IE2-4.

The first sensing electrodes IE1-1 to IE1-5 and the second sensing electrodes IE2-1 to IE2-4 may cross each other. The first sensing electrodes IE1-1 to IE1-5 and the second sensing electrodes IE2-1 to IE2-4 may be insulated from each other and form mutual capacitance. The first sensing electrodes IE1-1 to IE1-5 may be arranged in the first direction DR1 extending in the second direction DR2. The second sensing electrodes IE2-1 to IE2-4 may arranged in the second direction DR2 extending in the first direction DR1.

Each of the first sensing electrodes IE1-1 to IE1-5 may include first sensor portions SP1 and bridge portions CP1 that are disposed in the active region AA. Each of the second sensing electrodes IE2-1 to IE2-4 may include second sensor portions SP2 and extension portions CP2 that are disposed in the active region AA. Among the first sensor portions SP1, two first sensor units disposed at both ends of the first electrode AE may be smaller in size than, for example, half the size of, a first sensor portion disposed at the center thereof. Among the second sensor portions SP2, two second sensor portions disposed at both ends of the second electrode CE may be smaller in size than, for example, half the size of, a second sensor portion disposed at the center thereof.

FIG. 4 illustrates the first sensing electrodes IE1-1 to IE1-5 and the second sensing electrodes IE2-1 to IE2-4 according to an embodiment of the inventive concept, but their shapes are not limited thereto. In an embodiment of the inventive concept, each of the first sensing electrodes IE1-1 to IE1-5 and the second sensing electrodes IE2-1 to IE2-4 may have a bar shape extending in the first direction DR1 or the second direction DR2. Although the first sensor portions SP1 and the second sensor portions SP2 having a rhombus shape are illustrated in FIG. 4 as a non-limiting example, the present disclosure is not limited thereto, and each of the first sensor portions SP1 and the second sensor portions SP2 may have a different shape, for example, a polygonal shape, without deviating from the scope of the present disclosure.

The first sensor portions SP1 in a first sensing electrode IE1 (e.g., the first sensing electrodes IE1-1 to IE1-5) may be arranged in a column along the second direction DR2, and the second sensor portions SP2 in a second sensing electrode IE2 (e.g., the second sensing electrodes IE2-1 to IE2-4) may be arranged in a row along the first direction DR1. Each of the bridge portions CP1 electrically connects adjacent first sensor portions SP1, and each of the extension portions CP2 electrically connects adjacent second sensor portions SP2.

Each of the first and second sensor portions SP1 and SP2 may have a mesh shape. Each of the first sensor portions SP1 may include a plurality of first mesh lines, and each of the second sensor portions SP2 may include a plurality of second mesh lines. Each of the plurality of first and second mesh lines may extend along a direction inclined with respect to the first direction DR1 or the second direction DR2. The extension direction of each of the plurality of first and second mesh lines may not be limited thereto. For example, each of the plurality of first and second mesh lines may extend parallel to or perpendicular to the first direction DR1 or the second direction DR2.

In a case where each of the first sensor portions SP1 and the second sensor portions SP2 has a mesh shape, a parasitic capacitance of the first and second sensing electrodes IE1 and IE2 of the display panel DP (see FIG. 3B) may be reduced.

Each of the first sensing electrodes IE1-1 to IE1-5 and the second sensing electrodes IE2-1 to IE2-4 may contain a metallic material, such as silver, aluminum, copper, chromium, nickel, and titanium that may be suitable for a low-temperature process. It may prevent a damage to the light-emitting element ED (see FIG. 3B) even in a case where the input sensing layer ISP may be formed on the display panel DP in a continuous process.

The first signal lines SL1-1 to SL1-5 may be respectively connected to one ends of the first sensing electrodes IE1-1 to IE1-5. In one embodiment, the input sensing layer ISP may further include signal lines (not shown) that are connected to the other ends of the first sensing electrodes IE1-1 to IE1-5.

The first signal lines SL1-1 to SL1-5, the second signal lines SL2-1 to SL2-4, and the third signal lines SL2-5 to SL2-8 may be disposed in the non-active region NAA. The pad portion PLD may extend from one ends of the first signal lines SL1-1 to SL1-5, the second signal lines SL2-1 to SL2-4, and the third signal lines SL2-5 to SL2-8 and may include the input pads I-PD disposed in the non-active region NAA.

Figure 5A:
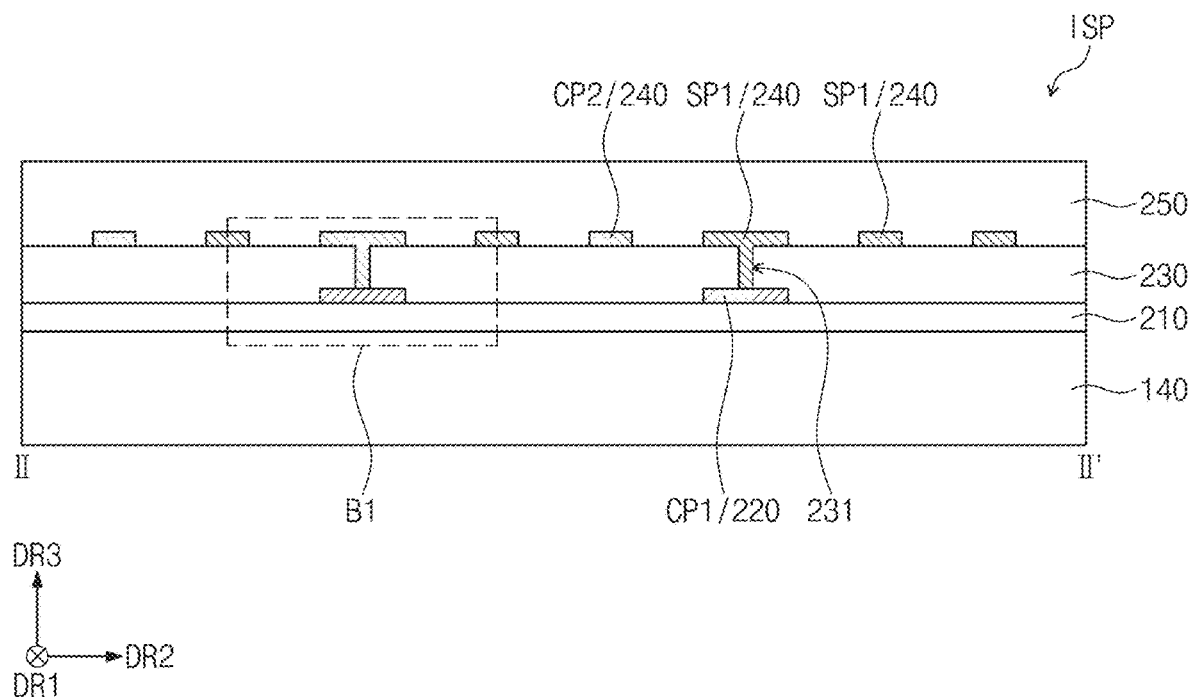
FIG. 5A is a cross-sectional view according to an embodiment of the input sensing layer taken along line II-II' illustrated in FIG. 4.

FIG. 5A is a cross-sectional view according to an embodiment of the input sensing layer ISP taken along line II-II' illustrated in FIG. 4, and FIGS. 5B to 5D are enlarged cross-sectional views of portion B1 illustrated in FIG. 5A according to embodiments of the inventive concept.

Figure 5B:
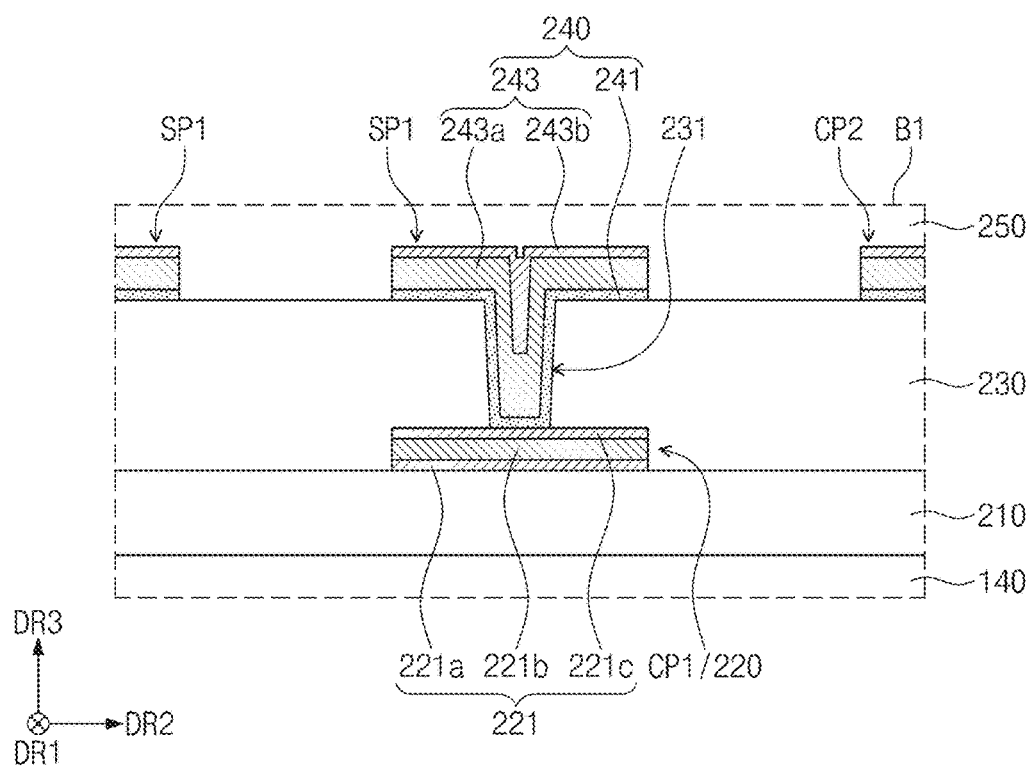
FIGS. 5B, 5C, and 5D are enlarged cross-sectional views of portion B1 illustrated in FIG. 5A according to embodiments of the inventive concept.

Referring to FIGS. 3B, 5A, and 5B, the input sensing layer ISP is provided on the display panel DP. The input sensing layer ISP may be disposed directly on the encapsulation layer 140. In this case, no intermediate layer may be disposed between the input sensing layer ISP and the encapsulation layer 140.

The input sensing layer ISP may include a base insulating layer 210, a first conductive layer 220, a sensing insulating layer 230, a second conductive layer 240, and a cover insulating layer 250.

The base insulating layer 210 may be disposed directly on the encapsulation layer 140. The base insulating layer 210 may be an inorganic layer including at least one of silicon nitride, silicon oxynitride, or silicon oxide. The base insulating layer 210 may have a single-layered structure or a multi-layered structure including multiple layers stacked along the third direction DR3.

The first conductive layer 220 may be disposed on the base insulating layer 210. The first conductive layer 220 may have a multi-layered structure including multiple layers stacked along the third direction DR3. The first conductive layer 220 having a multi-layered structure may include a metal layer. As an example of the inventive concept, the first conductive layer 220 may include a first main conductive layer 221. The first main conductive layer 221 may include a plurality of sub-conductive layers stacked along the third direction DR3. Referring to FIG. 5B, the first main conductive layer 221 includes a first sub-conductive layer 221a, a second sub-conductive layer 221b, and a third sub-conductive layer 221c, but the present disclosure is not limited thereto, and the first main conductive layer 221 may include a different number of sub-conductive layers. The first sub-conductive layer 221a may be disposed on the base insulating layer 210, the second sub-conductive layer 221b may be disposed on the first sub-conductive layer 221a, and the third sub-conductive layer 221c may be disposed on the second sub-conductive layer 221b. Each of the first to third sub-conductive layers 221a, 221b, and 221c may contain a metallic material, such as silver, aluminum, copper, chromium, nickel, titanium, or alloys thereof. For example, the first and third sub-conductive layers 221a and 221c may contain titanium or a titanium alloy, and the second sub-conductive layer 221b may contain aluminum or an aluminum alloy. However, the present disclosure is not limited thereto. For example, at least one of the first, second, and third sub-conductive layer 221a, 221b, and 221c may include a transparent conductive layer.

The first conductive layer 220 may have a single-layered structure. For example, the first conductive layer 220 may include a metal layer or a transparent conductive layer. The metal layer may contain molybdenum, silver, titanium, copper, aluminum, or alloys thereof. The transparent conductive layer may contain transparent conductive oxide such as indium tin oxide (ITO), indium zinc oxide (IZO), zinc oxide (ZnO), or indium zinc tin oxide (IZTO). In one embodiment, the transparent conductive layer may include a conductive polymer such as poly(3,4-ethylenedioxythiophene) PEDOT, metal nanowire, and graphene.

The sensing insulating layer 230 may be disposed on the base insulating layer 210. The sensing insulating layer 230 may cover the first conductive layer 220. As an example of the inventive concept, the sensing insulating layer 230 may include an organic layer or an inorganic layer. The organic layer may contain at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin. The inorganic layer may contain at least one of silicon nitride, silicon oxy nitride, or silicon oxide. The sensing insulating layer 230 may have a single-layered structure or a multi-layered structure including multiple layers stacked along the third direction DR3.

The second conductive layer 240 may be disposed on the sensing insulating layer 230. As an example of the inventive concept, the second conductive layer 240 may have a multi-layered structure including multiple layers stacked along the third direction DR3. The second conductive layer 240 having a multi-layered structure may include a metal layer. As an example of the inventive concept, the second conductive layer 240 may include a barrier layer 241 and a second main conductive layer 243. The barrier layer 241 may contain metallic nitride. As an example of the inventive concept, the barrier layer 241 may contain titanium nitride (TiN). The barrier layer 241 may be disposed directly on the sensing insulating layer 230. As an example of the inventive concept, the barrier layer 241 may have a thickness of about 700 Å. However, the present disclosure is not limited thereto, and the thickness of the barrier layer 241 may be varied without departing from the scope of the present disclosure.

The second main conductive layer 243 may include a plurality of sub-conductive layers stacked along the third direction DR3. Referring to FIG. 5B, the second main conductive layer 243 may include a fourth sub-conductive layer 243a and a fifth sub-conductive layer 243b, but the present disclosure is not limited thereto, and the second main conductive layer 243 may include a different number of sub-conductive layers. The fourth sub-conductive layer 243a may be disposed on the barrier layer 241, and the fifth sub-conductive layer 243b is disposed on the fourth sub-conductive layer 243a. Each of the fourth and fifth sub-conductive layers 243a and 243b may contain a metallic material, such as silver, aluminum, copper, chromium, nickel, titanium, or alloys thereof. The fourth and fifth sub-conductive layers 243a and 243b may contain different metallic materials. For example, the fourth sub-conductive layer 243a may contain aluminum or an aluminum alloy, and the fifth sub-conductive layer 243b may contain titanium or a titanium alloy. The fourth sub-conductive layer 243a may have a thickness greater than the thickness of the barrier layer 241 or the fifth sub-conductive layer 243b. As an example of the inventive concept, the fourth sub-conductive layer 243a may have a thickness of about 1500 Å. However, the present disclosure is not limited thereto, and the fourth sub-conductive layer 243a may have a different thickness without departing from the scope of the present disclosure.

In one embodiment, at least one of the fourth and fifth sub-conductive layers 243a and 243b may include a transparent conductive layer. The second main conductive layer 243 may have a single-layered structure or a multi-layered structure. The second main conductive layer 243 having a multi-layered structure may include at least one metal layer and at least one transparent conductive layer.

The cover insulating layer 250 may be disposed on the second conductive layer 240. The cover insulating layer 250 may include an organic layer. The organic layer may contain at least one of an acrylic-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin. The cover insulating layer 250 may protect the first and second conductive layers 220 and 240 from foreign materials such as moisture, oxygen, and dust particles.

As an example of the inventive concept, the bridge portions CP1 may be included in the first conductive layer 220, and the plurality of first sensor portions SP1, the plurality of second sensor portions SP2, and the extension portions CP2 may be included in the second conductive layer 240. Each of the plurality of first sensor portions SP1, the plurality of second sensor portions SP2, and the extension portions CP2 may have the same stacked structure. For example, each of the plurality of first sensor portions SP1, the plurality of second sensor portions SP2, and the extension portions CP2 may include the barrier layer 241 and the second main conductive layer 243.

A contact hole 231 exposing the bridge portions CP1 may be provided in the sensing insulating layer 230. Each of the first sensor portions SP1 provided on the sensing insulating layer 230 may directly come in contact with a corresponding bridge portion CP1 through the contact hole 231. In a case where the second conductive layer 240 includes the barrier layer 241, the barrier layer 241 of the first sensor portions SP1 may directly come in contact with the corresponding bridge portion CP1 through the contact hole 231.

In a case where the barrier layer 241 is not provided, the second main conductive layer 243 is disposed directly on the sensing insulating layer 230, and the sensing insulating layer 230 is an organic layer, a metal oxide layer (e.g., a titanium oxide ($TiO_x$) layer) may be formed between the second main conductive layer 243 and the sensing insulating layer 230. In this case, a defect may occur in which the second main conductive layer 243 is not normally patterned. For example, in a case where the second main conductive layer 243 is not normally patterned, the plurality of first sensor portions SP1, the plurality of second sensor portions SP2, and/or the extension portions CP2 may be short-circuited with each other. However, according to the present disclosure, the barrier layer 241 containing metal nitride (e.g., titanium nitride (TiN)) and disposed between the second main conductive layer 243 and the sensing insulating layer 230 may prevent formation of a metal oxide layer between the second main conductive layer 243 and the sensing insulating layer 230. As a result, process reliability may be improved in forming the first sensing electrodes IE1-1 to IE1-5 and the second sensing electrodes IE2-1 to IE2-4.

Figure 5C:
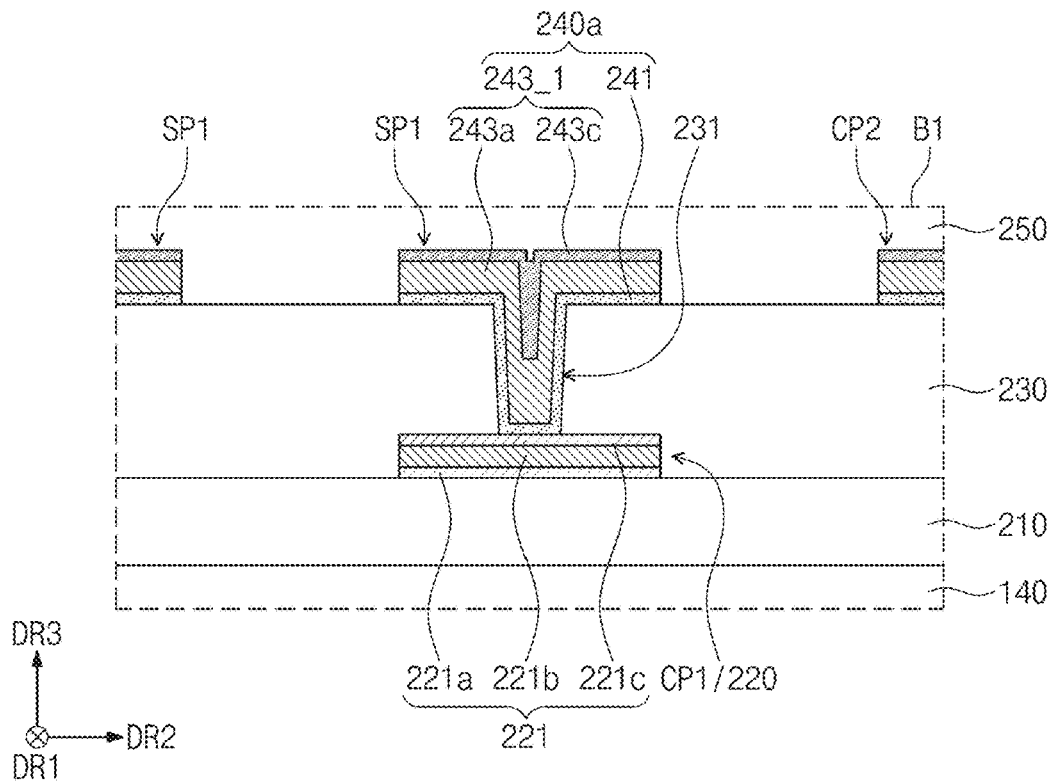

Referring to FIGS. 5A and 5C, a second conductive layer 240a may include the barrier layer 241 and a second main conductive layer 243_1. The barrier layer 241 may contain metal nitride. As an example of the inventive concept, the barrier layer 241 may contain titanium nitride (TiN). The barrier layer 241 may be disposed directly on the sensing insulating layer 230.

The second main conductive layer 243_1 may include a plurality of sub-conductive layers stacked along the third direction DR3. Referring to FIG. 5C, the second main conductive layer 243_1 may include a fourth sub-conductive layer 243a and a fifth sub-conductive layer 243c, but the present disclosure is not limited thereto, and the second main conductive layer 243_1 may include a different number of sub-conductive layers. The fourth sub-conductive layer 243a may be disposed on the barrier layer 241, and the fifth sub-conductive layer 243c may be disposed on the fourth sub-conductive layer 243a. The fourth sub-conductive layer 243a may contain a metallic material such as silver, aluminum, copper, chromium, nickel, titanium, or alloys thereof. For example, the fourth sub-conductive layer 243a may contain aluminum or an aluminum alloy. The fifth sub-conductive layer 243c may contain metal nitride. For example, the fifth sub-conductive layer 243c may include the same material as the barrier layer 241. For example, the barrier layer 241 and the fifth sub-conductive layer 243c may contain titanium nitride (TiN).

Figure 5D:
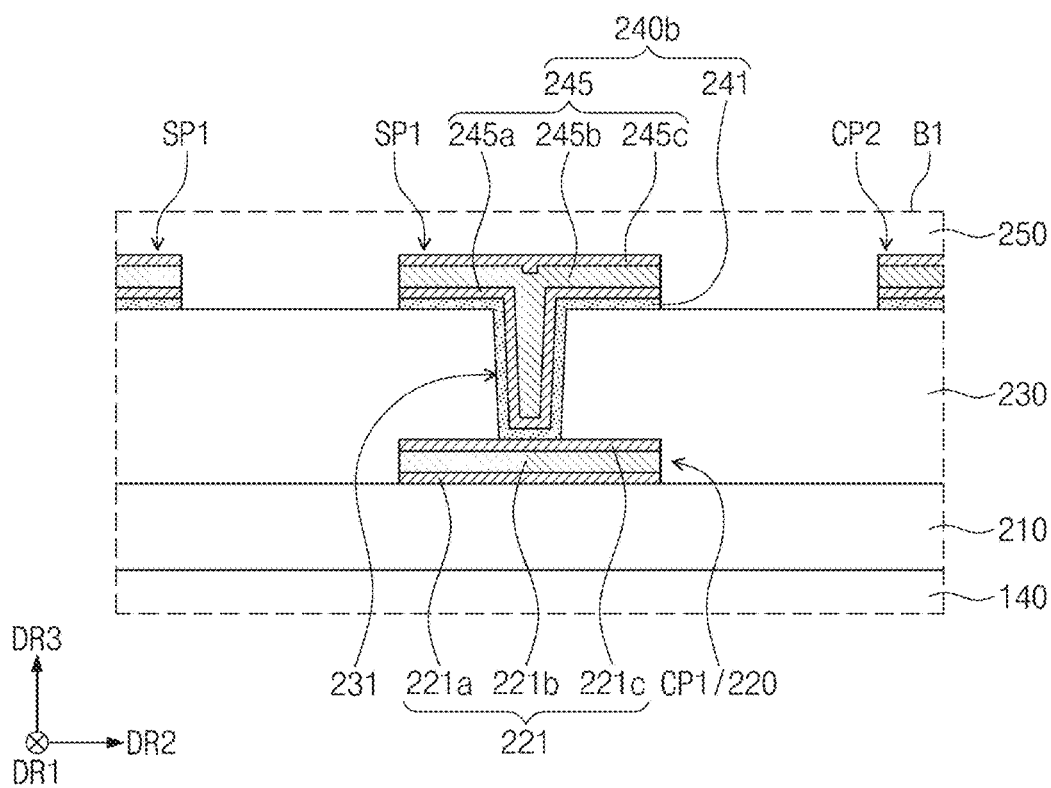

Referring to FIGS. 5A and 5D, a second conductive layer 240b may include the barrier layer 241 and a second main conductive layer 245. The barrier layer 241 may contain metal nitride. As an example of the inventive concept, the barrier layer 241 may contain titanium nitride (TiN). The barrier layer 241 may be disposed directly on the sensing insulating layer 230.

The second main conductive layer 245 may include a plurality of sub-conductive layers stacked along the third direction DR3. Referring to FIG. 5D, the second main conductive layer 245 includes a fourth sub-conductive layer 245a, a fifth sub-conductive layer 245b, and a sixth sub-conductive layer 245c, but the present disclosure is not limited thereto, and the second main conductive layer 245 may include a different number of sub-conductive layers. The fourth sub-conductive layer 245a may be disposed on the barrier layer 241, the fifth sub-conductive layer 245b may be disposed on the fourth sub-conductive layer 245a, and the sixth sub-conductive layer 245c may be disposed on the fifth sub-conductive layer 245b. Each of the fourth, fifth, and sixth sub-conductive layers 245a, 245b, and 245c may contain a metallic material, such as silver, aluminum, copper, chromium, nickel, titanium, or alloys thereof. The fourth and sixth sub-conductive layers 245a and 245c may contain a metallic material that is different from that of the fifth sub-conductive layer 245b. For example, the fourth and sixth sub-conductive layers 245a and 245c may contain titanium or a titanium alloy, and the fifth sub-conductive layer 245b may contain aluminum or an aluminum alloy. The barrier layer 241 may have a thickness of about 650 Å, and the fourth sub-conductive layer 245a may have a thickness of about 50 Å. The fifth sub-conductive layer 245b may have a thickness greater than those of the barrier layer 241 and the fourth and sixth sub-conductive layers 245a and 245c. As an example of the inventive concept, the fifth sub-conductive layer 245b may have a thickness of about 1500 Å.

As an example of the inventive concept, the bridge portions CP1 may be included in the first conductive layer 220, and the plurality of first sensor portions SP1, the plurality of second sensor portions SP2, and the extension portions CP2 may be included in the second conductive layer 240b. Each of the plurality of first sensor portions SP1, the plurality of second sensor portions SP2, and the extension portions CP2 may have the same stacked structure. For example, each of the plurality of first sensor portions SP1, the plurality of second sensor portions SP2, and the extension portions CP2 may include the barrier layer 241 and the second main conductive layer 245.

According to the present disclosure, the barrier layer 241 of the second conductive layer 240b may be in direct contact with the bridge portions CP1. Since the barrier layer 241 has excellent electrical conductivity and low electrical resistance, the barrier layer 241 that is in direct contact with the bridge portions CP1 does not significantly change the contact resistance between the first sensor portions SP and the bridge portions CP1 compared to a case where the barrier layer 241 is removed and the fourth sub-conductive layer 245a is in direct contact with the bridge portions CP1. Therefore, process reliability may be improved while maintaining the sensing sensitivity of the input sensing layer ISP.

Figure 6:
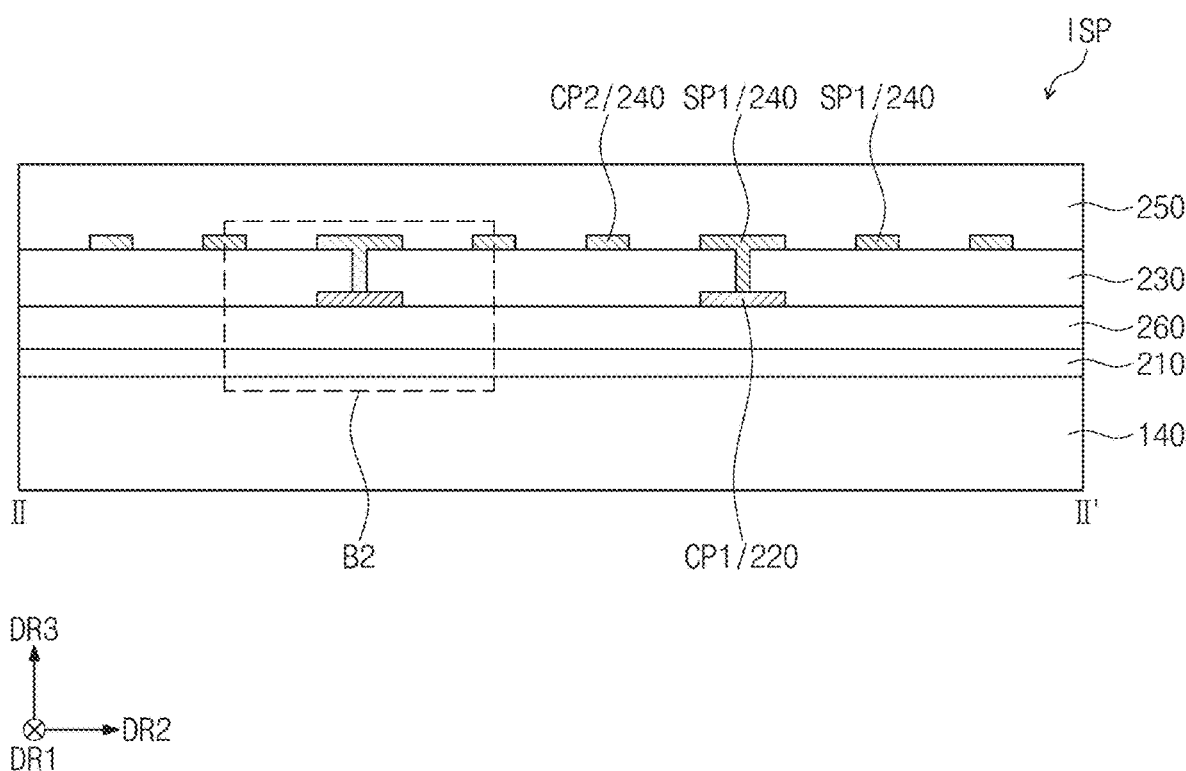
FIG. 6 is a cross-sectional view according to an embodiment of the input sensing layer taken along line II-II' illustrated in FIG. 4.
Figure 7A:
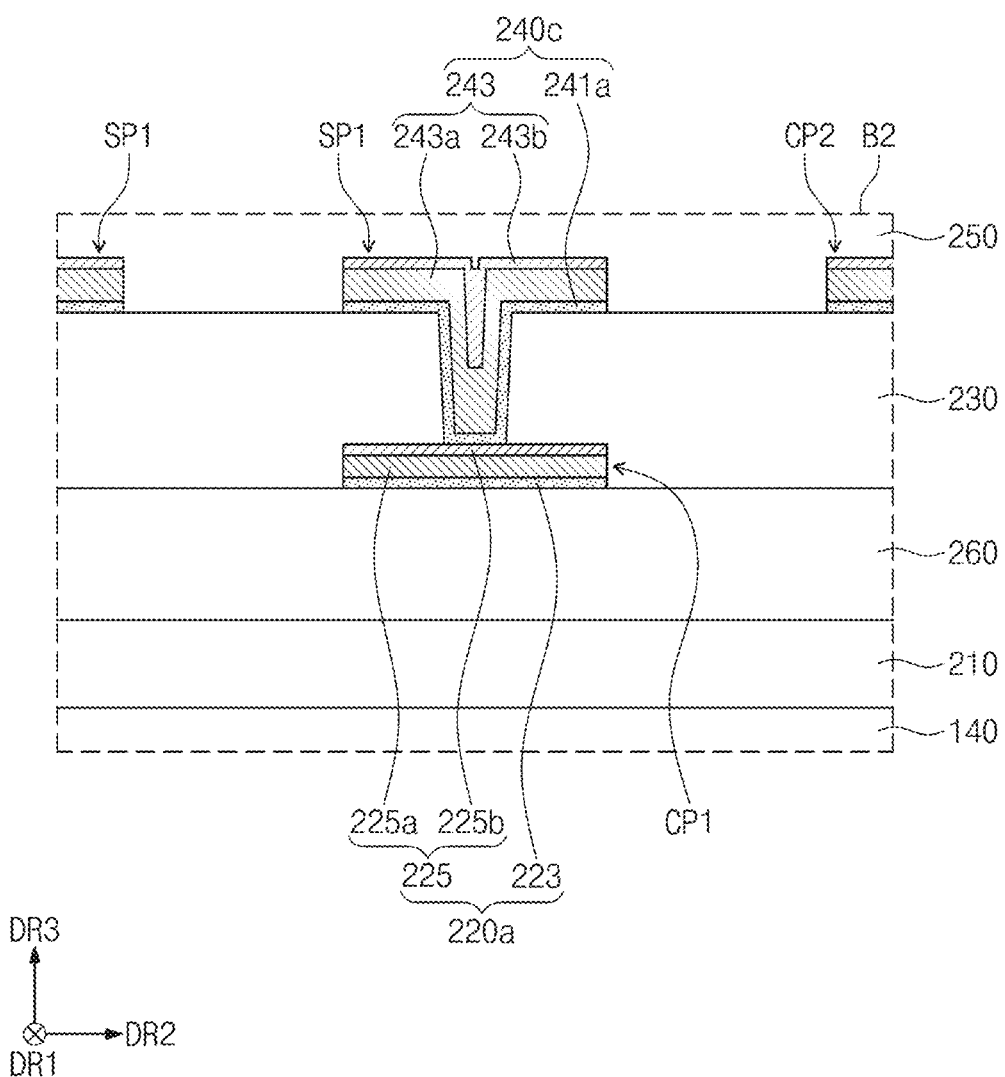
FIGS. 7A and 7B are enlarged cross-sectional views of portion B2 illustrated in FIG. 6 according to embodiments of the inventive concept.
Figure 7B:
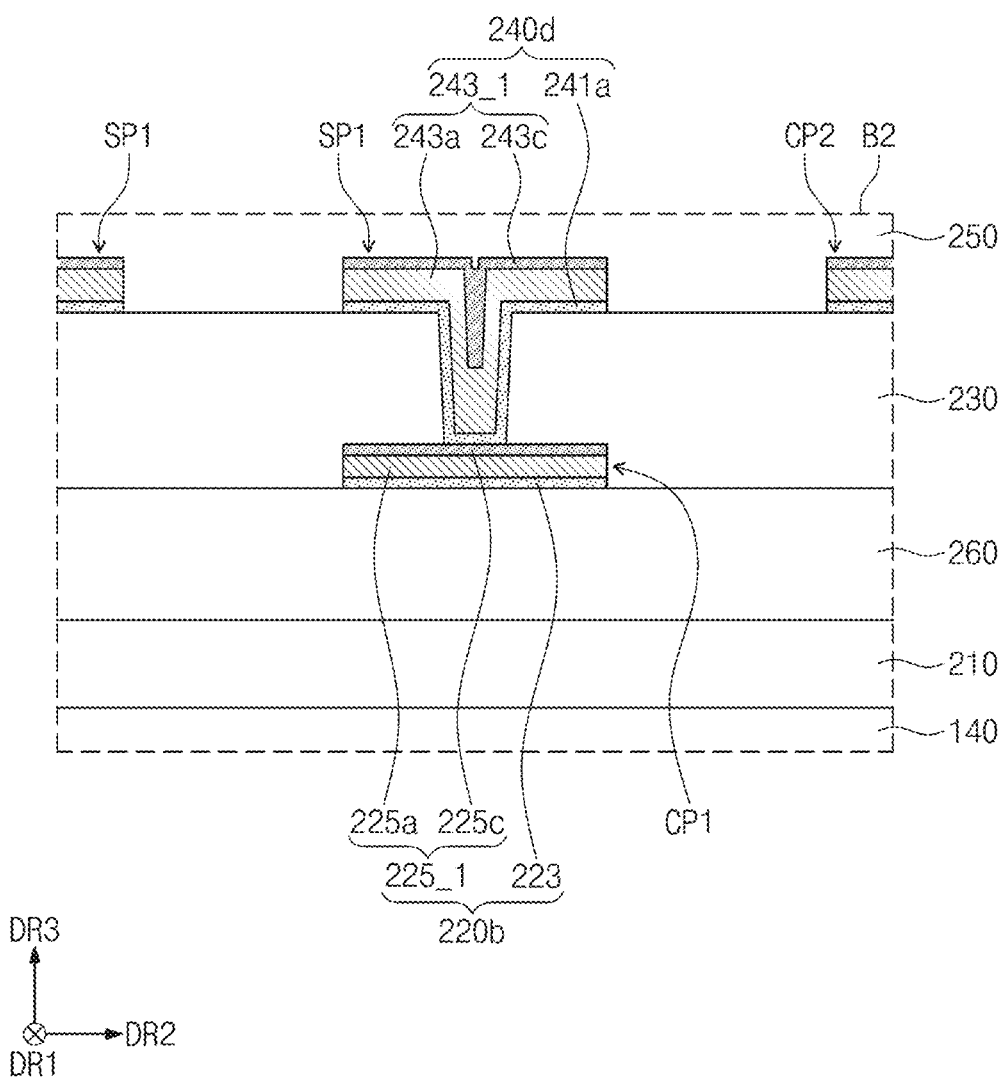

FIG. 6 is a cross-sectional view according to an embodiment of the input sensing layer ISP taken along line II-II' illustrated in FIG. 4, and FIGS. 7A and 7B are enlarged cross-sectional views of portion B2 illustrated in FIG. 6 according to embodiments of the inventive concept. The detailed descriptions of the components that have the same reference numerals and are described with reference to FIGS. 5A to 5D will be omitted.

Referring to FIGS. 3B, 6, and 7A, an input sensing layer ISP is provided on the display panel DP. The input sensing layer ISP may be disposed directly on the encapsulation layer 140.

The input sensing layer ISP may include a base insulating layer 210, a first sensing insulating layer 260, a first conductive layer 220a, a second sensing insulating layer 230, a second conductive layer 240c, and a cover insulating layer 250.

The first sensing insulating layer 260 may be disposed on the base insulating layer 210. The first sensing insulating layer 260 may be an organic layer. The organic layer may contain at least one of an acrylic-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin. In a case where the first sensing insulating layer 260 is provided, the base insulating layer 210 may be omitted.

The first conductive layer 220a may be disposed on the first sensing insulating layer 260. As an example of the inventive concept, the first conductive layer 220a may have a multi-layered structure including multiple layers stacked along the third direction DR3. The first conductive layer 220a having a multi-layered structure may include a metal layer. As an example of the inventive concept, the first conductive layer 220a may include a first barrier layer 223 and a first main conductive layer 225. The first barrier layer 223 may contain metal nitride. As an example of the inventive concept, the first barrier layer 223 may contain titanium nitride (TiN). The first barrier layer 223 may be disposed directly on the first sensing insulating layer 260.

The first main conductive layer 225 may include a plurality of sub-conductive layers stacked along the third direction DR3. Referring to FIG. 7A, the first main conductive layer 225 may include a first sub-conductive layer 225a and a second sub-conductive layer 225b, but the present disclosure is not limited thereto, and the first main conductive layer 225 may include a different number of sub-conductive layers. The first sub-conductive layer 225a may be disposed on the first barrier layer 223, and the second sub-conductive layer 225b may be disposed on the first sub-conductive layer 225a. Each of the first and second sub-conductive layers 225a and 225b may contain a metallic material, such as silver, aluminum, copper, chromium, nickel, titanium, or alloys thereof. The first and second sub-conductive layers 225a and 225b may contain different metallic materials. For example, the first sub-conductive layer 225a may contain aluminum or an aluminum alloy, and the second sub-conductive layer 225b may contain titanium or a titanium alloy. However, the present disclosure is not limited thereto. For example, at least one of the first and second sub-conductive layers 225a and 225b may include a transparent conductive layer.

The first main conductive layer 225 may have a single-layered structure or a multi-layered structure. The first main conductive layer 225 having a multi-layered structure may include at least one metal layer and at least one transparent conductive layer.

The second sensing insulating layer 230 may be disposed on the first sensing insulating layer 260. The second sensing insulating layer 230 may cover the first conductive layer 220a. The second sensing insulating layer 230 may include an organic layer. The second conductive layer 240c may be disposed on the second sensing insulating layer 230. The cover insulating layer 250 may cover the second conductive layer 240c.

The second conductive layer 240c may include a second barrier layer 241a and a second main conductive layer 243. The second barrier layer 241a may contain metal nitride. As an example of the inventive concept, the second barrier layer 241a may contain titanium nitride (TiN). The second barrier layer 241a may be disposed directly on the second sensing insulating layer 230.

The second main conductive layer 243 may include a plurality of sub-conductive layers stacked along the third direction DR3. Referring to FIG. 7A, the second main conductive layer 243 may include a fourth sub-conductive layer 243a and a fifth sub-conductive layer 243b, but the present disclosure is not limited thereto, and the second main conductive layer 243 may include a different number of sub-conductive layers. The fourth sub-conductive layer 243a may be disposed on the second barrier layer 241a, and the fifth sub-conductive layer 243b may be disposed on the fourth sub-conductive layer 243a. Each of the fourth and fifth sub-conductive layers 243a and 243b may contain a metallic material such as silver, aluminum, copper, chromium, nickel, titanium, or alloys thereof. The fourth and fifth sub-conductive layers 243a and 243b may contain different metallic materials. For example, the fourth sub-conductive layer 243a may contain aluminum or an aluminum alloy, and the fifth sub-conductive layer 243b may contain titanium or a titanium alloy. However, the present disclosure is not limited thereto. For example, at least one of the fourth and fifth sub-conductive layer 243a and 243b may include a transparent conductive layer.

Since the second sensing insulating layer 230, the second conductive layer 240c, and the cover insulating layer 250 have the same in structure as those described with respect to FIGS. 5A to 5D, the detailed descriptions thereof will be omitted.

As an example of the inventive concept, the bridge portions CP1 may be included in the first conductive layer 220a, and the plurality of first sensor portions SP1, the plurality of second sensor portions SP2, and the extension portions CP2 may be included in the second conductive layer 240c. Each of the plurality of first sensor portions SP1, the plurality of second sensor portions SP2, and the extension portions CP2 may have the same stacked structure. For example, each of the plurality of first sensor portions SP1, the plurality of second sensor portions SP2, and the extension portions CP2 may include the second barrier layer 241a and the second main conductive layer 243.

In a case where the first barrier layer 223 is not provided in the first conductive layer 220a, the first main conductive layer 225 is disposed directly on the first sensing insulating layer 260, and the sensing insulating layer 230 is an organic layer, a metal oxide layer (e.g., a TiO$_x$ layer) may be formed between the first main conductive layer 225 and the first sensing insulating layer 260. In this case, a defect may occur in which the first main conductive layer 225 is not normally patterned. For example, in a case where the first main conductive layer 225 is not normally patterned, the bridge portions CP1 may be short-circuited with each other. However, according to the present disclosure, the first barrier layer 223 including metal nitride (e.g., titanium nitride (TiN)) and disposed between the first main conductive layer 225 and the first sensing insulating layer 260 may prevent formation of a metal oxide layer (e.g., a titanium oxide (TiOx) layer) between the first main conductive layer 225 and the first sensing insulating layer 260.

Similarly, the second barrier layer 241a including metal nitride (e.g., titanium nitride (TiN)) and disposed between the second main conductive layer 243 and the second sensing insulating layer 230 may prevent formation of a metal oxide layer (e.g., a titanium oxide (TiOx) layer) between the second conductive layer 240c and the second sensing insulating layer 230.

Referring to FIGS. 6 and 7B, a first conductive layer 220b may include a first barrier layer 223 and a first main conductive layer 225_1. The first barrier layer 223 may contain metal nitride. As an example of the inventive concept, the first barrier layer 223 may contain titanium nitride (TiN). The first barrier layer 223 may be disposed directly on the first sensing insulating layer 260.

The first main conductive layer 225_1 may include a plurality of sub-conductive layers stacked along the third direction DR3. Referring to FIG. 7B, the first main conductive layer 225_1 may include a first sub-conductive layer 225a and a second sub-conductive layer 225c, but the present disclosure is not limited thereto, and the first main conductive layer 225_1 may include a different number of sub-conductive layers. The first sub-conductive layer 225a may be disposed on the first barrier layer 223, and the second sub-conductive layer 225c may be disposed on the first sub-conductive layer 225a. The first sub-conductive layer 225a may contain a metallic material such as silver, aluminum, copper, chromium, nickel, titanium, or alloys thereof. For example, the first sub-conductive layer 225a may contain aluminum or an aluminum alloy. The second sub-conductive layer 225c may contain metal nitride. The second sub-conductive layer 225c may contain the same material as the first barrier layer 223. For example, the first barrier layer 223 and the second sub-conductive layer 225c may contain titanium nitride (TiN).

A second conductive layer 240d may be disposed on the second sensing insulating layer 230. The second conductive layer 240d may include a second barrier layer 241a and a second main conductive layer 243_1. The second barrier layer 241a may contain metal nitride. As an example of the inventive concept, the second barrier layer 241a may contain titanium nitride (TiN). The second barrier layer 241a may be disposed directly on the second sensing insulating layer 230.

The second main conductive layer 243_1 may include a plurality of sub-conductive layers stacked along the third direction DR3. Referring to FIG. 7B, the second main conductive layer 243_1 may include a fourth sub-conductive layer 243a and a fifth sub-conductive layer 243c, but the present disclosure is not limited thereto, and the second main conductive layer 243_1 may include a different number of sub-conductive layers. The fourth sub-conductive layer 243a may be disposed on the second barrier layer 241a, and the fifth sub-conductive layer 243c may be disposed on the fourth sub-conductive layer 243a. The fourth sub-conductive layers 243a may contain a metallic material, such as silver, aluminum, copper, chromium, nickel, titanium, or alloys thereof. For example, the fourth sub-conductive layer 243a may contain aluminum. The fifth sub-conductive layer 243c may contain metal nitride. For example, the fifth sub-conductive layer 243c may contain the same material as the second barrier layer 241a. For example, the second barrier layer 241a and the fifth sub-conductive layer 243c may contain titanium nitride (TiN).

Figure 8:
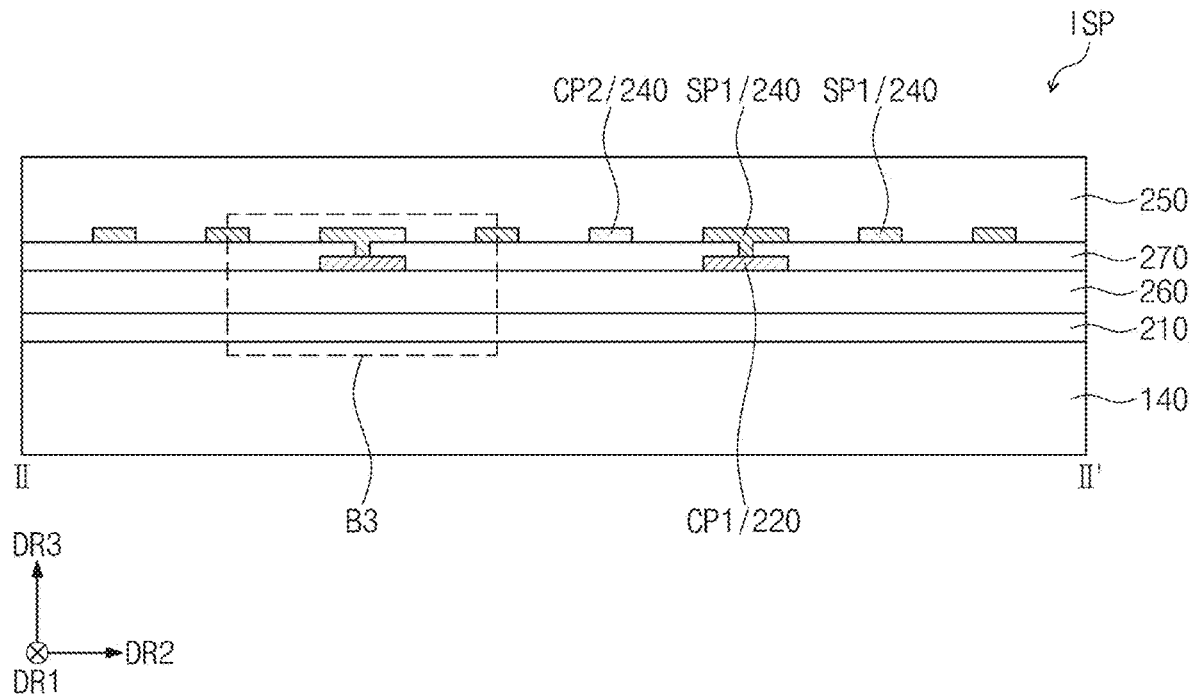
FIG. 8 is a cross-sectional view according to an embodiment of the input sensing layer taken along line II-II' illustrated in FIG. 4.
Figure 9:
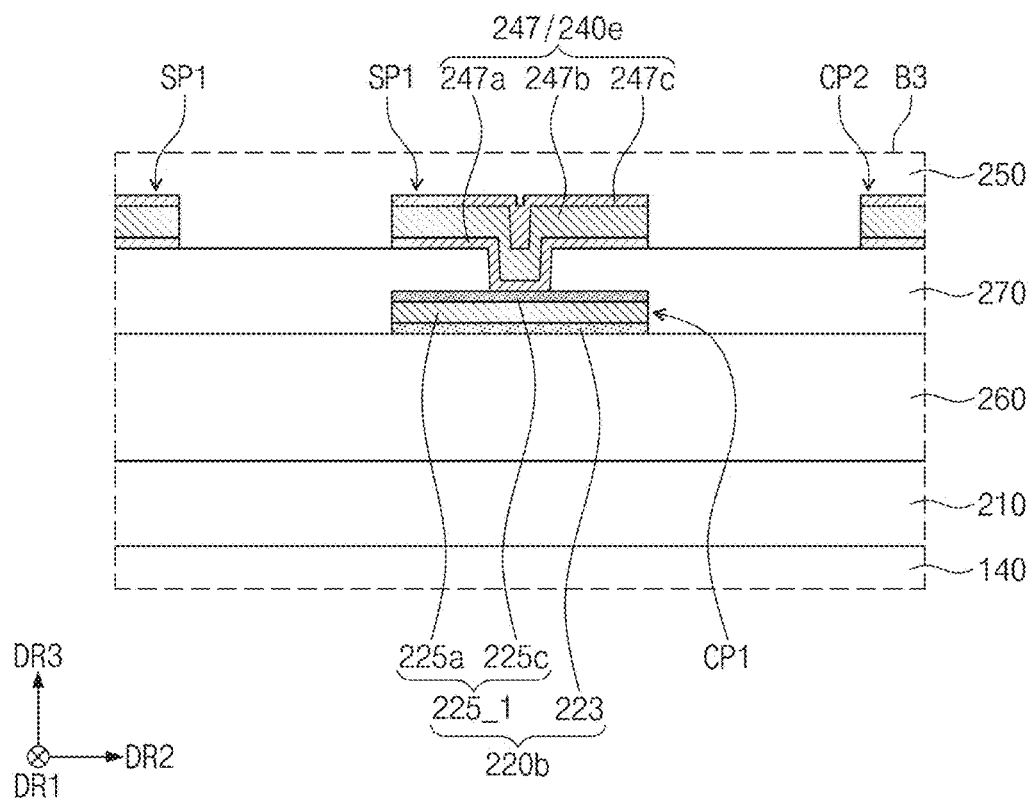
FIG. 9 is an enlarged cross-sectional view of portion B3 illustrated in FIG. 8.

FIG. 8 is a cross-sectional view according to an embodiment of the input sensing layer ISP taken along line II-II' illustrated in FIG. 4. FIG. 9 is an enlarged cross-sectional view of portion B3 illustrated in FIG. 8. The detailed descriptions of the components that have the same reference numerals and are described with reference to FIGS. 6 and 7B will be omitted.

Referring to FIGS. 3B, 8 and 9, an input sensing layer ISP is provided on the display panel DP. The input sensing layer ISP may be disposed directly on the encapsulation layer 140.

The input sensing layer ISP may include a base insulating layer 210, a first sensing insulating layer 260, a first conductive layer 220, a second sensing insulating layer 270, a second conductive layer 240, and a cover insulating layer 250. The first conductive layer 220 and the second conductive layer 240 of FIG. 8 may correspond to and have a multi-layered structure of a first conductive layer 220b and a second conductive layer 240e of FIG. 9, respectively, in one embodiment.

The first sensing insulating layer 260 may be disposed on the base insulating layer 210. The first sensing insulating layer 260 may be an organic layer. The organic layer may contain at least one of an acrylic-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin. In a case where the first sensing insulating layer 260 is provided, the base insulating layer 210 may be omitted.

The first conductive layer 220b may be disposed on the first sensing insulating layer 260. As an example of the inventive concept, the first conductive layer 220b may have a multi-layered structure including multiple layers stacked along the third direction DR3. The first conductive layer 220b having a multi-layered structure may include a metal layer. As an example of the inventive concept, the first conductive layer 220b may include a first barrier layer 223 and a first main conductive layer 225_1. The first barrier layer 223 may contain metal nitride. As an example of the inventive concept, the first barrier layer 223 may contain titanium nitride (TiN). The first barrier layer 223 may be disposed directly on the first sensing insulating layer 260.

The first main conductive layer 225_1 may include a plurality of sub-conductive layers stacked along the third direction DR3. Referring to FIG. 9, the first main conductive layer 225_1 may include a first sub-conductive layer 225a and a second sub-conductive layer 225c, but the present disclosure is not limited thereto, and the first main conductive layer 225_1 may include a different number of sub-conductive layers. The first sub-conductive layer 225a may be disposed on the first barrier layer 223, and the second sub-conductive layer 225c may be disposed on the first sub-conductive layer 225a. The first sub-conductive layer 225a may contain a metallic material such as silver, aluminum, copper, chromium, nickel, titanium, or alloys thereof. For example, the first sub-conductive layer 225a may contain aluminum or an aluminum alloy. The second sub-conductive layer 225c may contain metal nitride. The first barrier layer 223 and the second sub-conductive layer 225c may contain the same material. For example, the first barrier layer 223 and the second sub-conductive layer 225c may contain titanium nitride (TiN).

The second sensing insulating layer 270 is disposed on the first sensing insulating layer 260. The second sensing insulating layer 270 may cover the first conductive layer 220b.

The second sensing insulating layer 270 may include an inorganic layer. The inorganic layer may contain at least one of silicon nitride, silicon oxynitride, or silicon oxide.

The second conductive layer 240e may be disposed on the second sensing insulating layer 270. The second conductive layer 240e may include a second main conductive layer 247.

The second main conductive layer 247 may include a plurality of sub-conductive layers stacked along the third direction DR3. Referring to FIG. 9, the second main conductive layer 247 includes a fourth sub-conductive layer 247a, a fifth sub-conductive layer 247b, and a sixth sub-conductive layer 247c, but the present disclosure is not limited thereto, and the second main conductive layer 247 may include a different number of sub-conductive layers. The fourth sub-conductive layer 247a may be disposed on the second sensing insulating layer 270, the fifth sub-conductive layer 247b may be disposed on the fourth sub-conductive layer 247a, and the sixth sub-conductive layer 247c may be disposed on the fifth sub-conductive layer 247b. Each of the fourth, fifth, and sixth sub-conductive layers 247a, 247b, and 247c may contain a metallic material, such as silver, aluminum, copper, chromium, nickel, titanium, or alloys thereof. For example, the fourth and sixth sub-conductive layers 247a and 247c may contain titanium or a titanium alloy, and the fifth sub-conductive layer 247b may contain aluminum or an aluminum alloy. However, the present disclosure is not limited thereto. For example, at least one of the fourth, fifth, and sixth sub-conductive layer 247a, 247b, and 247c may include a transparent conductive layer.

The cover insulating layer 250 may cover the second conductive layer 240e. The detailed descriptions on the cover insulating layer 250 will be omitted.

As an example of the inventive concept, the bridge portions CP1 may be included in the first conductive layer 220b, and the plurality of first sensor portions SP1, the plurality of second sensor portions SP2, and the extension portions CP2 may be included in the second conductive layer 240e. Each of the plurality of first sensor portions SP1, the plurality of second sensor portions SP2, and the extension portions CP2 may have the same stacked structure. For example, each of the plurality of first sensor portions SP1, the plurality of second sensor portions SP2, and the extension portions CP2 may include the second main conductive layer 247.

In a case where the first barrier layer 223 is not provided in the first conductive layer 220b, and the first main conductive layer 225_1 is disposed directly on the first sensing insulating layer 260, a metal oxide layer (e.g., a TiOx layer) may be formed between the first main conductive layer 225_1 and the first sensing insulating layer 260. In this case, a defect may occur in which the first main conductive layer 225_1 is not normally patterned. For example, in a case where the first main conductive layer 225_1 is not normally patterned, the bridge portions CP1 may be short-circuited with each other. However, according to the present disclosure, the first barrier layer 223 including metal nitride (e.g., titanium nitride (TiN)) and disposed between the first main conductive layer 225_1 and the first sensing insulating layer 260 may prevent formation of a metal oxide layer (e.g., a titanium oxide (TiOx) layer) between the first main conductive layer 225_1 and the first sensing insulating layer 260.

Likewise, in a case where the sensing insulating layer 260 including an organic layer is disposed below the first conductive layer 220b, the first conductive layer 220b may include the first barrier layer 223 containing metal nitride. Accordingly, the first barrier layer 223 formed in the input sensing layer ISP may prevent formation of a metal oxide between the organic layer that is included in the sensing insulating layer 260 and the conductive layer (e.g., the first conductive layer 220b), thereby preventing a phenomenon in which a portion of the conductive layer is not etched due to the metal oxide.

Figure 10:
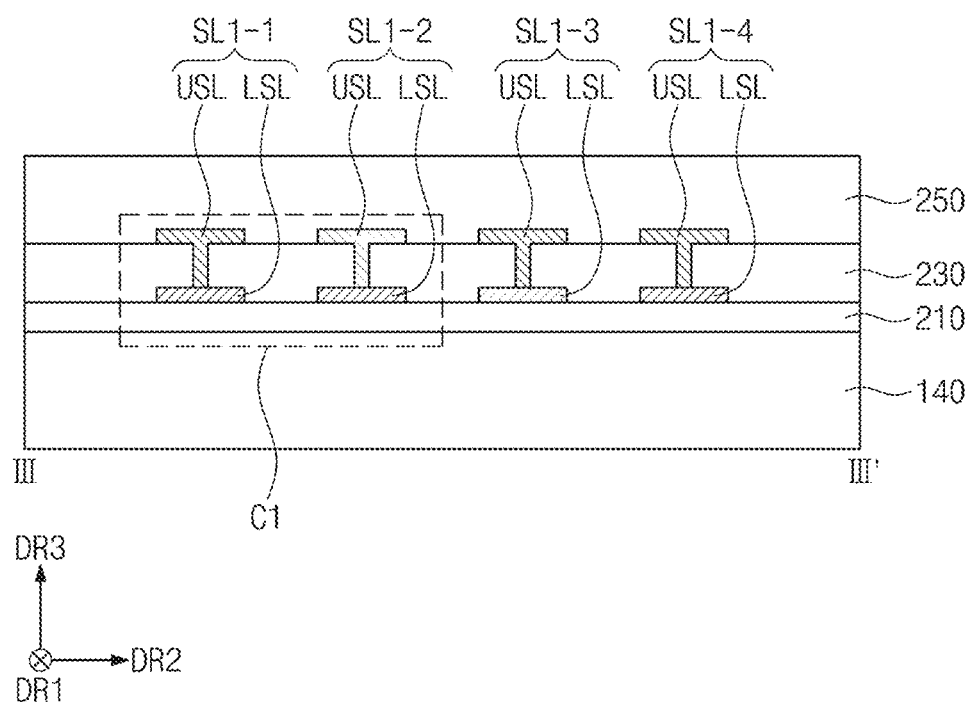
FIG. 10 is a cross-sectional view according to an embodiment of the input sensing layer taken along line III-III' illustrated in FIG. 4.
Figure 11A:
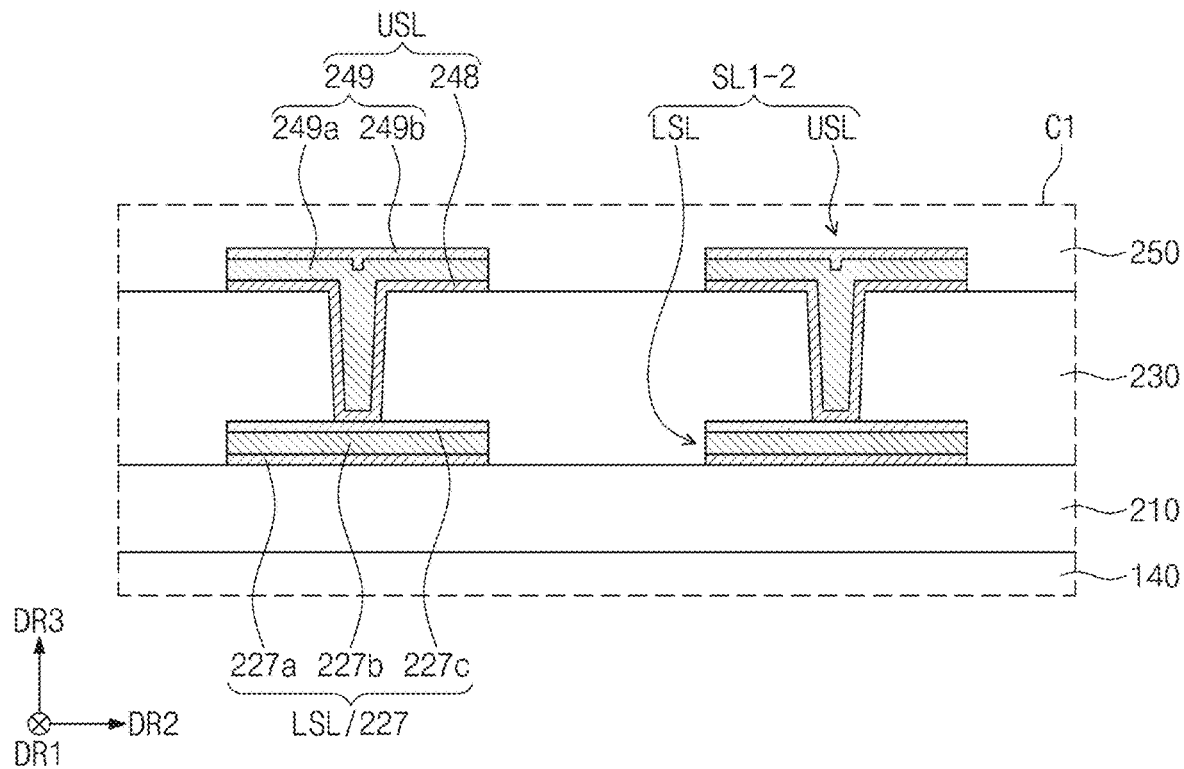
FIGS. 11A and 11B are enlarged cross-sectional views of portion C1 illustrated in FIG. 10 according to embodiments of the inventive concept.
Figure 11B:
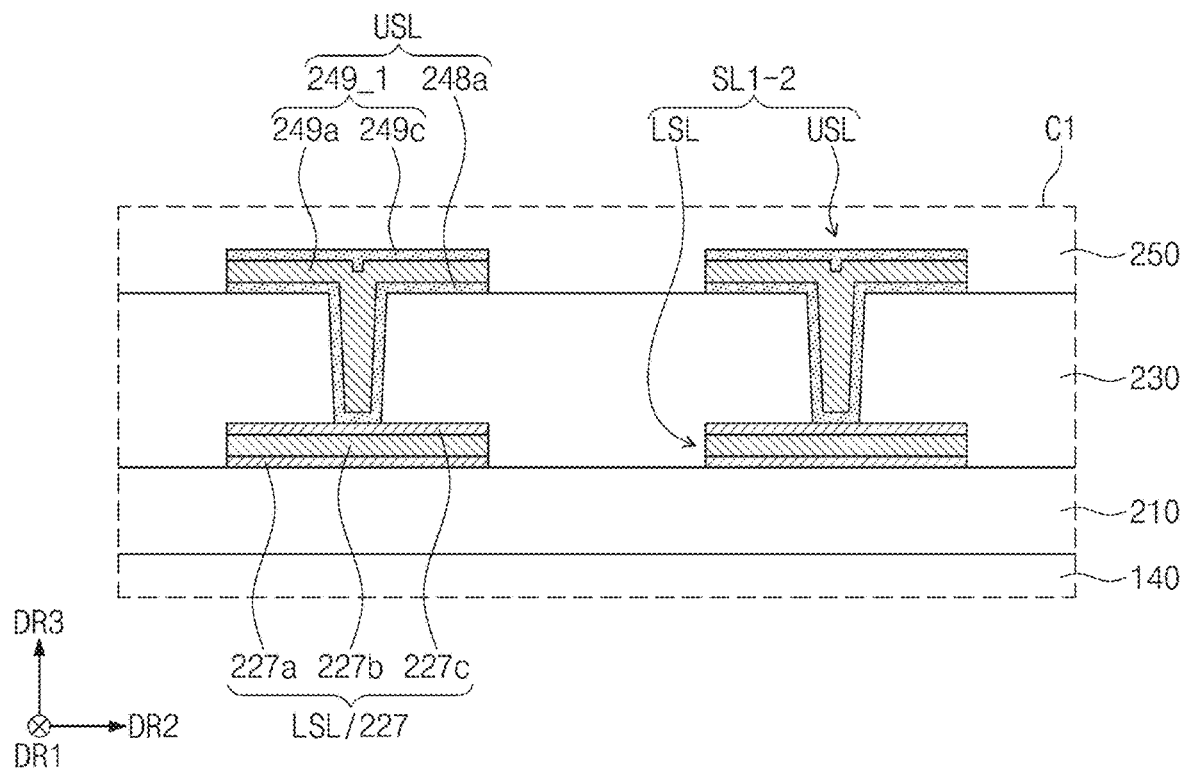

FIG. 10 is a cross-sectional view according to an embodiment of the input sensing layer ISP taken along line III-III' illustrated in FIG. 4. FIGS. 11A and 11B are enlarged cross-sectional views of portion C1 illustrated in FIG. 10 according to embodiments of the inventive concept.

Referring to FIGS. 4, 10, and 11A, the input sensing layer ISP may include first signal lines SL1-1 to SL1-5, second signal lines SL2-1 to SL2-4, and third signal lines SL2-5 to SL2-8 that are disposed in the non-active region NAA. Each of the first signal lines SL1-1 to SL1-5, the second signal lines SL2-1 to SL2-4, and the third signal lines SL2-5 to SL2-8 may have a multi-layered structure. FIG. 10 illustrates, as an example, the first signal lines SL1-1 to SL1-4, but each of the second signal lines SL2-1 to SL2-4 and the third signal lines SL2-5 to SL2-8 may have a structure similar to that of the first signal lines SL1-1 to SL1-5.

Each of the plurality of first signal lines SL1-1 to SL1-4 may include a lower wiring layer LSL and an upper wiring layer USL. The lower wiring layer LSL may be disposed on the base insulating layer 210, and the upper wiring layer USL may be disposed on the sensing insulating layer 230. That is, the lower wiring layer LSL and the first conductive layer 220 (see FIG. 5A) may be disposed on the same layer, and the upper wiring layer USL and the second conductive layer 240 (see FIG. 5A) may be disposed on the same layer.

The lower wiring layer LSL may include a first main wiring layer 227. The first main wiring layer 227 may include a plurality of sub wiring layers sequentially stacked in the third direction DR3. As an example of the inventive concept, the first main wiring layer 227 may include a first sub-wiring layer 227a, a second sub-wiring layer 227b, and a third sub-wiring layer 227c. The first sub-wiring layer 227a may be disposed on the base insulating layer 210, the second sub-wiring layer 227b may be disposed on the first sub-wiring layer 227a, and the third sub-wiring layer 227c may be disposed on the second sub-wiring layer 227b. Each of the first to third sub-wiring layers 227a, 227b, and 227c may contain a metallic material such as silver, aluminum, copper, chromium, nickel, titanium, or alloys thereof. For example, the first and third sub-wiring layers 227a and 227c may contain titanium or a titanium alloy, and the second sub-wiring layer 227b may contain aluminum or an aluminum alloy.

In a case where an organic layer is further disposed between the lower wiring layer LSL and the base insulating layer 210, or the base insulating layer 210 is provided as an organic layer, the lower wiring layer LSL may further include a first barrier wiring layer in addition to the first main wiring layer 227. The first barrier wiring layer may include metal nitride (e.g., titanium nitride (TiN)).

The sensing insulating layer 230 may cover the lower wiring layer LSL in the non-active region NAA. The upper wiring layer USL may be provided on the sensing insulating layer 230 in the non-active region NAA. The upper wiring layer USL may include a second barrier wiring layer 248 and a second main wiring layer 249. The second barrier wiring layer 248 may be disposed directly on the sensing insulating layer 230. The second barrier wiring layer 248 may contain metal nitride. As an example of the inventive concept, the second barrier wiring layer 248 may contain titanium nitride (TiN).

The second main wiring layer 249 may be provided on the second barrier wiring layer 248. The second main wiring layer 249 may include a plurality of sub-wiring layers sequentially stacked in the third direction DR3. As an example of the inventive concept, the second main wiring layer 249 may include a fourth sub-wiring layer 249a and a fifth sub-wiring layer 249b. The fourth sub-wiring layer 249a may be disposed on the second barrier wiring layer 248, and the fifth sub-wiring layer 249b may be disposed on the fourth sub-wiring layer 249a. Each of the fourth and fifth sub-wiring layers 249a and 249b may contain a metallic material such as silver, aluminum, copper, chromium, nickel, titanium, or alloys thereof. For example, the fourth sub-wiring layer 249a may contain aluminum or an aluminum alloy, and the fifth sub-wiring layer 249b may contain titanium or a titanium alloy.

In a case where the second barrier wiring layer 248 is not provided in the upper wiring layer USL and the second main wiring layer 249 is disposed directly on the sensing insulating layer 230, a metal oxide layer (e.g., a titanium oxide (TiOx) layer) may be formed between the second main wiring layer 249 and the sensing insulating layer 230. IN this case, a defect may occur in which the second main wiring layer 249 is not normally patterned. For example, in a case where the second main wiring layer 249 is not normally patterned, the first signal lines SL1-1 to SL1-4 may be short-circuited with each other. However, according to the present disclosure, the second barrier wiring layer 248 including metal nitride (e.g., titanium nitride (TiN)) and disposed between the second main wiring layer 249 and the sensing insulating layer 230 may prevent formation of a metal oxide layer (e.g., a titanium oxide (TiOx) layer) between the second main wiring layer 249 and the sensing insulating layer 230.

Referring to FIGS. 10 and 11B, the upper wiring layer USL may include a second barrier wiring layer 248a and a second main wiring layer 249_1. The second barrier wiring layer 248a may be disposed directly on the sensing insulating layer 230. The second barrier wiring layer 248a may contain metal nitride. As an example of the inventive concept, the second barrier wiring layer 248a may contain titanium nitride (TiN).

The second main wiring layer 249_1 may be provided on the second barrier wiring layer 248a. The second main wiring layer 249_1 may include a plurality of sub-wiring layers sequentially stacked in the third direction DR3. As an example of the inventive concept, the second main wiring layer 249_1 may include a fourth sub-wiring layer 249a and a fifth sub-wiring layer 249c. The fourth sub-wiring layer 249a may be disposed on the second barrier wiring layer 248a, and the fifth sub-wiring layer 249c may be disposed on the fourth sub-wiring layer 249a. The fourth sub-wiring layer 249a may contain a metallic material such as silver, aluminum, copper, chromium, nickel, titanium, or alloys thereof. For example, the fourth sub-wiring layer 249a may contain aluminum or an aluminum alloy. The fifth sub-wiring layer 249c may contain titanium or a titanium alloy. The second barrier wiring layer 248a and the fifth sub-wiring layer 249c may contain the same material. That is, the second barrier wiring layer 248a and the fifth sub-wiring layer 249c may contain titanium nitride (TiN).

Likewise, in a case where the sensing insulating layer 230 or 260 including an organic layer is disposed below any one of the lower and upper wiring layers LSL and USL, any one of the lower and upper wiring layers LSL and USL may include a barrier wiring layer (e.g., the second barrier wiring layer 248 and the second barrier wiring layer 248a) containing metal nitride. Accordingly, the barrier wiring layer formed in the input sensing layer ISP may prevent formation of a metal oxide between the organic layer that is included in the sensing insulating layer 260 and the wiring layer (e.g., the second main wiring layer 249 and the second main wiring layer 249_1), thereby preventing a phenomenon in which a portion of the wiring layer is not etched due to the metal oxide.

In addition, FIGS. 10, 11A, and 11B illustrate, as an example, that each signal line has a multi-layered structure including the lower and upper wiring layers LSL and USL, but the present disclosure is not limited thereto. Each signal line may have a single-layered structure including any one of the lower wiring layer LSL and the upper wiring layer USL. In a case where the sensing insulating layer 230 or 260 including an organic layer is disposed below any one of the lower and upper wiring layers LSL and USL, any one of the lower and upper wiring layers LSL and USL may have the barrier wiring layer 248 or 248a including metal nitride. Accordingly, the input sensing layer ISP may prevent formation of a metal oxide between the organic layer and the wiring layer, thereby preventing a phenomenon in which a portion of the wiring layer is not etched due to the metal oxide.

Figure 12A:
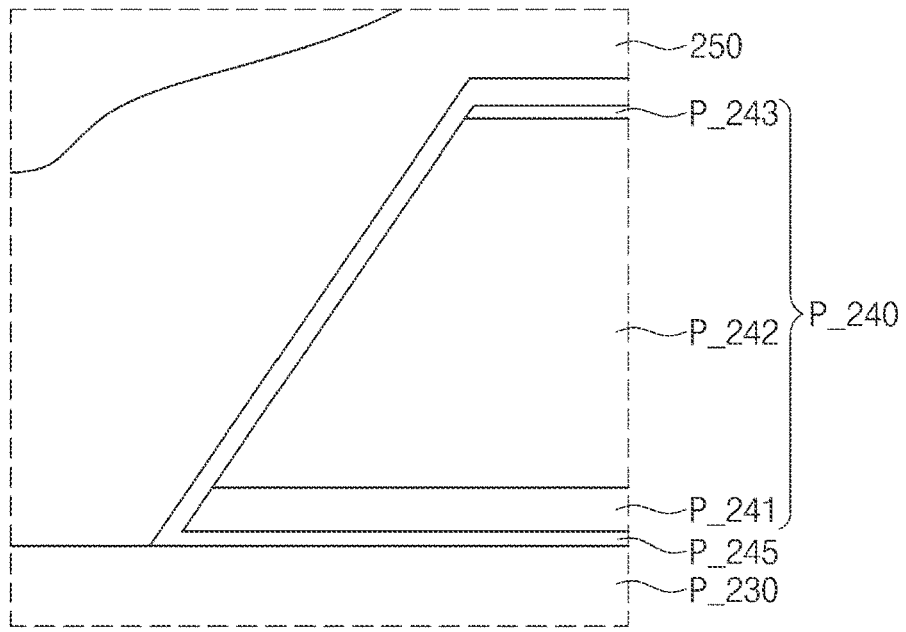
FIG. 12A illustrates a cross-sectional views of an input sensing layer in which a metal oxide is formed between a conductive layer and a sensing insulating layer.
Figure 12B:
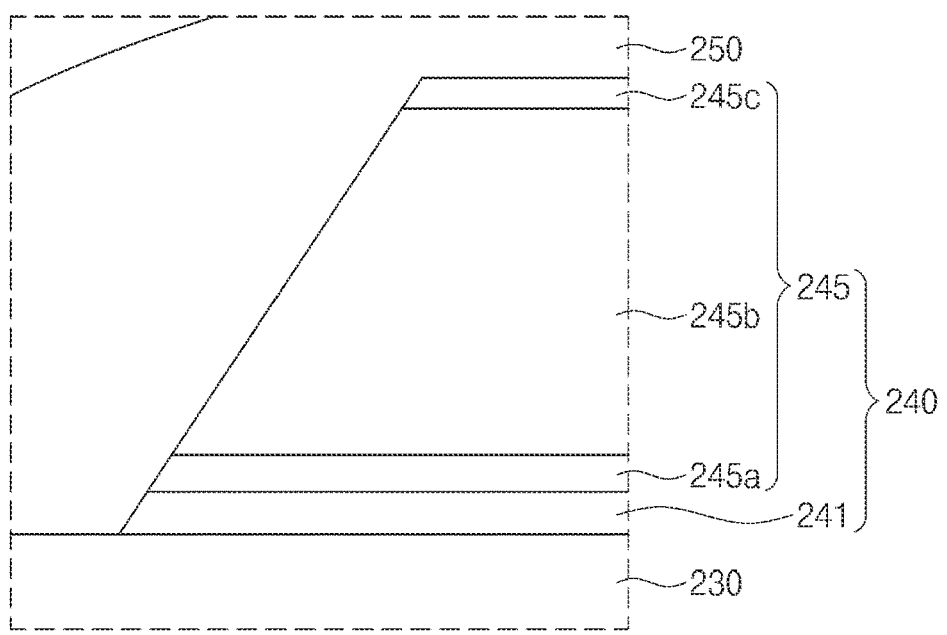
FIGS. 12B and 12C illustrate cross-sectional views of an input sensing layer in which no metal oxide is formed between a second conductive layer and a sensing insulating layer according to embodiments of the inventive concept.
Figure 12C:
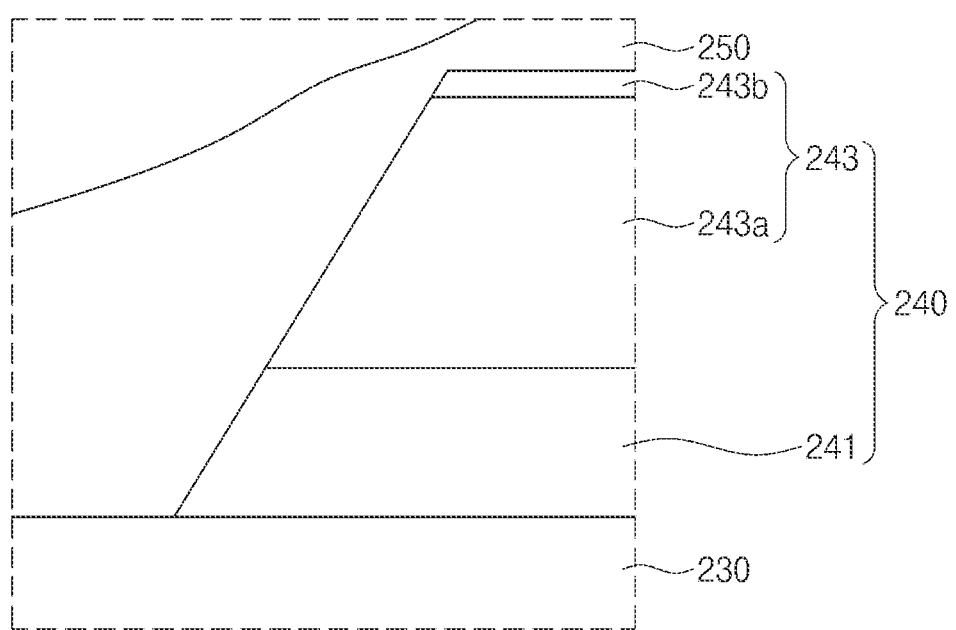

FIG. 12A illustrates a cross-sectional views of an input sensing layer in which a metal oxide is formed between a conductive layer and a sensing insulating layer, and FIGS. 12B and 12C illustrate cross-sectional views of the input sensing layer ISP in which no metal oxide is formed between a conductive layer having a barrier layer and a sensing insulating layer according to embodiments of the inventive concept.

Referring to FIG. 12A, the conductive layer P_240 includes a first sub-conductive layer P_241, a second sub-conductive layer P_242, and a third sub-conductive layer P_243 but does not include a barrier layer and. The first and third sub-conductive layers P_241 and P_243 may include titanium, and the second sub-conductive layer P_242 may include aluminum. In a case, where a sensing insulating layer P_230 is an organic layer, the organic layer and the first sub-conductive layer P_241 may react with each other between the sensing insulating layer P_230 and the conductive layer P_240 to form a titanium oxide (TiOx) layer P_245. The titanium oxide layer P_245 may have a thickness of approximately 10.9 nm.

Referring to FIGS. 12B and 12C, the barrier layer 241 including titanium nitride (TiN) may be provided in the second conductive layer 240. In this case, although the sensing insulating layer 230 is an organic layer, no titanium oxide layer may be formed between the second conductive layer 240 and the sensing insulating layer 230. In addition, regardless of whether the fourth sub-conductive layer 243a containing aluminum is disposed on the barrier layer 241 or the fourth sub-conductive layer 245a containing titanium is disposed on the barrier layer 241, no titanium oxide layer may be formed between the conductive layer 240 and the sensing insulating layer 230.

Therefore, the input sensing layer ISP that includes the barrier layer 241 may prevent formation of a metal oxide between the organic layer and the conductive layer, thereby preventing a phenomenon in which a portion of the conductive layer is not etched due to the metal oxide.

According to an embodiment, the input sensing layer ISP includes a barrier layer containing metal nitride (e.g., titanium nitride (TiN)) disposed between a main conductive layer constituting a conductive layer and a sensing insulating layer. Therefore, the input sensing layer IPS may prevent formation of a metal oxide layer between the conductive layer and the sensing insulating layer, and as a result, may improve process reliability in forming the input sensing layer ISP.

Although the present disclosure has been described with reference to some embodiments, those skilled in the art will understand that various modifications and changes can be made to the present disclosure without departing from the spirit and scope of the present disclosure including the following claims.

Therefore, the technical scope of the present disclosure should not be limited to the contents described in the detailed description of the specification, but should be determined by the present disclosure as a whole including the claims below.

What is claimed is:

1. A display device comprising:
a display panel configured to display an image; and
an input sensing layer disposed on the display panel,
wherein the input sensing layer comprises:
  an insulating layer having a contact hole disposed on the display panel; and
  a conductive layer disposed on the insulating layer,
  wherein the conductive layer comprises:
  a barrier layer that is disposed directly on the insulating layer and comprises metal nitride; and
  a main conductive layer disposed on the barrier layer,
  wherein a part of the barrier layer and a part of the main conductive layer are disposed in the contact hole.

2. The display device of claim 1, wherein the barrier layer contains titanium nitride (TiN).

3. The display device of claim 2, wherein the main conductive layer comprises:
a first sub-conductive layer disposed on the barrier layer; and
a second sub-conductive layer disposed on the first sub-conductive layer.

4. The display device of claim 3, wherein the first conductive layer and the second sub-conductive layer comprise different metallic materials.

5. The display device of claim 4, wherein the first sub-conductive layer comprises aluminum or an aluminum alloy.

6. The display device of claim 4, wherein the second sub-conductive layer comprises titanium or a titanium alloy.

7. The display device of claim 4, wherein the second sub-conductive layer comprises titanium nitride (TiN).

8. The display device of claim 2, wherein the main conductive layer comprises:
a first sub-conductive layer disposed on the barrier layer;
a second sub-conductive layer disposed on the first sub-conductive layer; and
a third sub-conductive layer disposed on the second sub-conductive layer.

9. The display device of claim 8, wherein the second sub-conductive layer comprises a material different from those of the first sub-conductive layer and the third sub-conductive layer.

10. The display device of claim 9, wherein:
the first sub-conductive layer comprises titanium or a titanium alloy; and
the second sub-conductive layer comprises aluminum or an aluminum alloy.

11. The display device of claim 9, wherein the third sub-conductive layer comprises titanium or titanium nitride (TiN).

12. The display device of claim 1, wherein the insulating layer is an organic layer comprising an organic material.

13. A display device comprising:
a display panel configured to display an image; and
an input sensing layer disposed on the display panel,
wherein the input sensing layer comprises:
- a base insulating layer disposed on the display panel;
- a first conductive layer disposed on the base insulating layer;
- an insulating layer covering the first conductive layer; and
- a second conductive layer disposed on the insulating layer, wherein the second conductive layer comprises:
- a second barrier layer comprising metal nitride; and
- a second main conductive layer disposed on the second barrier layer.

14. The display device of claim 13, wherein the insulating layer is an organic layer comprising an organic material.

15. The display device of claim 13, wherein the second barrier layer comprises titanium nitride (TiN).

16. The display device of claim 13, wherein the second main conductive layer comprises:
- a first sub-conductive layer disposed on the second barrier layer; and
- a second sub-conductive layer disposed on the first sub-conductive layer.

17. The display device of claim 16, wherein the first sub-conductive layer and the second sub-conductive layer comprise different metallic materials.

18. The display device of claim 17, wherein:
the first sub-conductive layer comprises aluminum or an aluminum alloy; and
the second sub-conductive layer comprises titanium or titanium nitride (TiN).

19. The display device of claim 13, wherein the second main conductive layer comprises:
- a first sub-conductive layer disposed on the second barrier layer;
- a second sub-conductive layer disposed on the first sub-conductive layer; and
- a third sub-conductive layer disposed on the second sub-conductive layer.

20. The display device of claim 19, wherein the second sub-conductive layer comprises a metallic material different from those of the first sub-conductive layer and the third sub-conductive layer.

21. The display device of claim 20, wherein:
the first sub-conductive layer comprises titanium or a titanium alloy;
the second sub-conductive layer comprises aluminum or an aluminum alloy; and
the third sub-conductive layer comprises titanium or titanium nitride (TiN).

22. The display device of claim 13, wherein the base insulating layer is an organic layer comprising an organic material.

23. The display device of claim 22, wherein the first conductive layer comprises:
- a first barrier layer disposed on the base insulating layer and comprising metal nitride; and
- a first main conductive layer disposed on the first barrier layer.

24. The display device of claim 23, wherein each of the first barrier layer and the second barrier layer comprises titanium nitride (TiN).

25. The display device of claim 23, wherein the first main conductive layer comprises:
- a first sub-conductive layer disposed on the first barrier layer; and
- a second sub-conductive layer disposed on the first sub-conductive layer.

26. The display device of claim 25, wherein the first sub-conductive layer and the second sub-conductive layer comprise different metallic materials.

\* \* \* \* \*